United States Patent
Rofe et al.

(10) Patent No.: US 10,911,501 B2
(45) Date of Patent: Feb. 2, 2021

(54) COLLABORATIVE SESSION OVER A NETWORK

(71) Applicant: Falmouth University, Falmouth (GB)

(72) Inventors: Michael David Rofe, Falmouth (GB); Federico Reuben Paris, York (GB)

(73) Assignee: Falmouth University, Falmouth (GB)

( * ) Notice: Subject to any disclaimer, the term of this patent is extended or adjusted under 35 U.S.C. 154(b) by 0 days.

(21) Appl. No.: 16/787,992

(22) Filed: Feb. 11, 2020

(65) Prior Publication Data

US 2020/0186575 A1  Jun. 11, 2020

Related U.S. Application Data

(63) Continuation of application No. PCT/EP2018/070300, filed on Jul. 26, 2018.

(30) Foreign Application Priority Data

Aug. 23, 2017 (GB) .................................. 1713554.2

(51) Int. Cl.
| | |
|---|---|
| H04L 29/06 | (2006.01) |
| H04L 7/00 | (2006.01) |
| H04L 12/26 | (2006.01) |
| H04N 5/073 | (2006.01) |
| G10H 1/00 | (2006.01) |

(52) U.S. Cl.
CPC ........ *H04L 65/1083* (2013.01); *H04L 7/0041* (2013.01); *H04L 43/0864* (2013.01); *H04L 43/10* (2013.01); *H04L 65/1069* (2013.01); *H04L 65/403* (2013.01); *H04N 5/073* (2013.01); *G10H 1/0058* (2013.01); *G10H 2240/175* (2013.01)

(58) Field of Classification Search
CPC combination set(s) only.
See application file for complete search history.

(56) References Cited

U.S. PATENT DOCUMENTS

| | | | |
|---|---|---|---|
| 5,558,339 A * | 9/1996 | Perlman | .................. A63F 13/12 463/42 |
| 6,353,174 B1 | 3/2002 | Schmidt et al. | |
| 6,653,545 B2 | 11/2003 | Redmann et al. | |

(Continued)

OTHER PUBLICATIONS

International Search Report and Written Opinion dated Jan. 11, 2019 for PCT Application No. PCT/EP2018/070301.

(Continued)

*Primary Examiner* — Phung-Hoang J Nguyen
(74) *Attorney, Agent, or Firm* — EIP US LLP

(57) ABSTRACT

Certain examples described herein provide a method for providing a collaborative session over a network. In these examples, a collaborative session is a series of geographically-separated temporally-coordinated events, such as a performance or concert. In examples, a global latency is set for the collaborative session. The global latency is set to a value greater than a longest latency for a plurality of client devices engaging in the collaborative session, and is defined as a function of a temporal rate for the series of temporally-coordinated events. During the collaborative session data streams are received from the plurality of client devices and presentation of the received data streams on the plurality of client devices is synchronised to enforce the global latency.

18 Claims, 11 Drawing Sheets

(56) References Cited

U.S. PATENT DOCUMENTS

| | | |
|---|---|---|
| 2008/0065925 A1 | 3/2008 | Oliverio et al. |
| 2008/0212617 A1* | 9/2008 | Flesch .................. G10H 1/0058 370/503 |
| 2009/0113022 A1 | 4/2009 | Quoc et al. |
| 2018/0196393 A1* | 7/2018 | Oda ........................ G04F 5/025 |

OTHER PUBLICATIONS

United Kingdom Combined Search and Examination Report dated Jan. 30, 2018 for GB Application No. 1713554.2.
Schuett, Nathan, "The Effects of Latency on Ensemble Performance", May 2002, National Science Foundation, CCRMA Department of Music, Stanford University Stanford, California.

* cited by examiner

COLLABORATIVE SESSION OVER A NETWORK

CROSS-REFERENCE TO RELATED APPLICATIONS

This application is a continuation of International Application No. PCT/EP2018/070300, filed Jul. 26, 2018 which claims priority to UK Application No. GB1713554.2, filed Aug. 23, 2017, under 35 U.S.C. § 119(a). Each of the above referenced patent applications is incorporated by reference in its entirety.

BACKGROUND OF THE INVENTION

Field of the Invention

The present invention relates to providing a collaborative session over a network. The collaborative session may comprise a series of geographically-separated temporally-coordinated events, such as a musical or theatrical performance. The collaborative session involves a plurality of client devices communicatively coupled by the network.

Description of the Related Technology

Participation in ensemble performance has been shown to bring about wide-ranging personal, social and musical benefits. For example, positive impacts of participation include benefits to a performer's or instrumentalist's technique and creativity, an establishment of connectedness and intimacy that helps promote positive social interactions and builds a sense of community, and benefits to individuals' psychological wellbeing. Yet young and amateur performers often live in geographically remote locations, where access to ensemble performance opportunities can be limited. For example, the time, expense or logistics of travel can make participation on a regular basis impossible.

This is especially true for small island or rural communities, such as the Isles of Scilly or the offshore islands of Scotland in the United Kingdom. The Isles of Scilly have a permanent population of just over 2200 people. This means that music lessons are limited to two or three instruments and are dependent on the expertise of island residents. Furthermore, the limitations of population mean that it is simply not possible to gain experience of playing in larger ensembles.

Telematic performance—broadly defined as performance that takes place over telecommunications networks such as the internet—has a capacity to provide a technical solution to enable those in remote locations to collaborate with others: in theory, musicians anywhere in the world could, given appropriate equipment, connect together and make music online. However, in practice, telematic performance is limited by the issue of latency—the short time delay involved in processing data and sending it over the network.

Research suggests that latency in audio performances becomes noticeable above 20-30 ms. Once latency rises above this level, rhythmic relationships are deformed; indeed noticeable audio latency often increases the variability in performer timing. Often the presence of noticeable audio latency quickly leads to a collapse of the performance as performers can no longer temporally coordinate events within the performance.

One solution to the issue of latency is to provide high speed internet backbones such as the Internet2, GEANT and JANET (Joint Academic Network) networks. These connections allow for high-quality transmission of audio over a network. Although latency still exists, it is low enough to avoid notice or disruption. The high speed Internet2, GEANT and JANET are academic networks in the United States, Europe and the United Kingdom respectively. For example, the JANET network provides a backbone with Gigabit per second speeds. These high speed links have been used for telematic performance by groups led by Chris Chafe at the Centre for Computer Research in Music and Acoustics (CCRMA), Stanford University. They often use software such as JackTrip, which is provided by the Centre. Another dedicated network platform is LOLA: LOw LAtency audiovisual streaming system. Its architects state that the 'LOLA project aims to enable real time musical performances where musicians are physically located in remote sites, connected by advanced network services like the ones provided by NRENs and GEANT and other international backbones'. The LOLA project was developed by Conservatorio di Musica Giuseppe Tartini in collaboration with GARR (Gruppo per l'Armonizzazione delle Reti della Ricerca), the Italian Research and Academic Network. LOLA is mostly used over GEANT but has also been used over JANET and Internet2 connections.

The approaches described above rely on connections between specialist institutions that are connected to high-speed networks. These specialist institutions are mostly universities in large towns or cities. As such, these approaches still exclude the possibility of collaboration from geographically remote locations, such as island or rural locations. For example, all telematic performance solutions require a sub-30 ms latency to avoid noticeable effects. To achieve this a minimum connection speed of 1 Gbps is specified. As of 2017 such speeds are only available through the JANET network in the United Kingdom, limiting use to academic institutions connected to this network. Schools and community centres, as well as private connections, are thus still excluded. This exclusion increases the further a site is located from large urban centres, as networks progressively drop in connection speed.

Another issue is that latency cannot be removed altogether, due to physical limitations. For example, the maximum speed of light in a vacuum is approximately $3 \times 10^8$ m/s. At this maximum speed it still takes light approximately 34 ms to travel between Chicago and Tokyo. This is above the sub-30 ms latency discussed above. In practice, the actual latency is greater than this value, as the narrow fibre optic cables that propagate the beams of light used for communication add significant resistance.

Any theoretical minimum latency also ignores the effects of network infrastructure and network traffic, amongst other effects. For example, in practice a network connection does not take place entirely over fibre optic cable. Often, the first and last stretches of the journey take place over copper cable, local wireless networks (WiFi) or mobile 3G/4G networks, all of which have significantly slower transmission speeds. Furthermore, devices within the network, such as routers, firewalls, switches and exchanges each themselves add latency, increasing the transmission time of data.

Partially for these reasons, there is also often a discrepancy between advertised connection speeds and actual measured network speeds. This means that even if collaboration is attempted over a theoretically suitable connection, e.g. based on advertised connection speeds, an actual collaboration session may experience a large variability in connection speeds, with many of these being lower than those advertised. Network traffic is also an issue for collaborative sessions. In the United Kingdom, a network connection can be up to 30% slower during peak usage times of 7 pm to 11 pm. This is often the time that performances are scheduled. The issue of network traffic is increasing as more network users stream audio and video data rather than make use of digital broadcast services.

Another solution is to avoid collaboration and revert to broadcast communications during a performance. For example, it is possible to use audio and video streaming technologies, such as video conferencing, to allow music teachers to remotely instruct students. However, in this case, bi-directional, interactive music-making is not possible due to the high variable latency of the connection (e.g. above the sub-30 ms level). Participants do not perform live together. Moreover, many video conferencing technologies use audio gating to supress echo, meaning only one node can make sound at a time, and often filter for speech, making them unsuitable for musical performances, e.g. by diminishing the sound quality of selected musical instruments.

U.S. Pat. No. 6,653,545 B2 describes a method and apparatus to permit real time, distributed performance by multiple musicians at remote locations. The latency of the communication channel is transferred to the behaviour of the local instrument so that a natural accommodation is made by the musician. In particular, a delay is applied at each local performance station. Delays are applied to local and remote musical events. This allows musical events that actually occur simultaneously at remote locations to be played together at each location, though not simultaneously at all locations. For example, at each local performance station a local delay value is set as a maximum local latency relative to the station, e.g. as the latency between the local performance station and the slowest of its peers. This allows locations having low latency connections to retain some of their advantage. The amount of induced latency can be overridden by each musician. This document describes how delays of 60 ms to 100 ms may be perceptible and requires an experienced musician to adapt to the (noticeable) delay. The document describes how some events received with a delay greater than a given latency threshold may be ignored. This latency threshold is set as 60 ms. In practice, delays of 60 ms to 100 ms are difficult for musicians to adapt to and the distributed performance typically collapses. The maximum delay provided by examples is 125 ms.

U.S. Pat. No. 6,353,174 B1 describes a system and method for achieving near real-time musical collaboration by a group of users using computers connected by a network. Each computer system plays a stream of musical data to each user. The musical data stream played to each user corresponds to the musical collaboration produced by the users. The playing of the musical data streams is staggered such that each user is located at a different time in the musical collaboration than every other user. This staggering separates any two users by a temporal offset that exceeds the maximum time required to transmit musical data from one user to another user over the network. Each user is allowed to modify the portion of the musical data stream that is currently being played to that user. Such musical data modifications are transmitted to other users over the network to become incorporated into the musical data streams played to those other users. Because the musical data streams are staggered by a temporal offset that exceeds the maximum latency of the network, those other users receive the musical data modifications with sufficient time to incorporate them into the locally played musical data streams. However, the staggering of transmissions used in this system and method only allow one-directional collaboration, live or near live bi-directional collaboration is not possible.

US 2009/0113022 A1 discloses an apparatus and methods for facilitating music collaboration between remote musicians (or the like) are provided. In general, mechanisms for facilitating live music collaborations or "jam sessions" over a computer network are described. These mechanisms allow musicians to perform from remote locations via one or more computer networks. Each musician is able to receive live video feeds from each of the other musicians during such jam session. Other computer users may form members of an audience who also receive such live video feeds from the musicians participating in the live jam session. The audience members may also receive a mixed audio feed of the audio streams from all of the participating musicians. This 'audience' mixed audio feed may be delayed by a highest latency value for a set of remote jam session members. However, the 'audience' member is not able to interact in the jam session. To deal with a problem of latency US 2009/0113022 A1 teaches to provide jam members with a synchronised metronome rather than audio streams from other jam members.

As discussed above, successful solutions for telematic performance typically require the use of rare, high-specification connections to reduce latency below a noticeable level, or abandon a collaborative aspect for broadcast-based performances. These do not allow genuine, bi-directional interaction for people in remote communities, such as allowing them to engage in large-scale ensemble performances, such as music-making. Research indicates that bi-directional interaction is an important element for providing benefits to local communities. Telematic performance solutions are thus desired that enable performers in remote communities to experience the well-documented potential benefits of ensemble performances.

SUMMARY

Certain aspects of the present invention are set out in the appended independent claims. Certain variations of these aspects are set out in the appended dependent claims.

Further features and advantages of the invention will become apparent from the following description of certain examples, which are made with reference to the accompanying drawings.

DETAILED DESCRIPTION OF CERTAIN INVENTIVE EMBODIMENTS

Figure 1A:
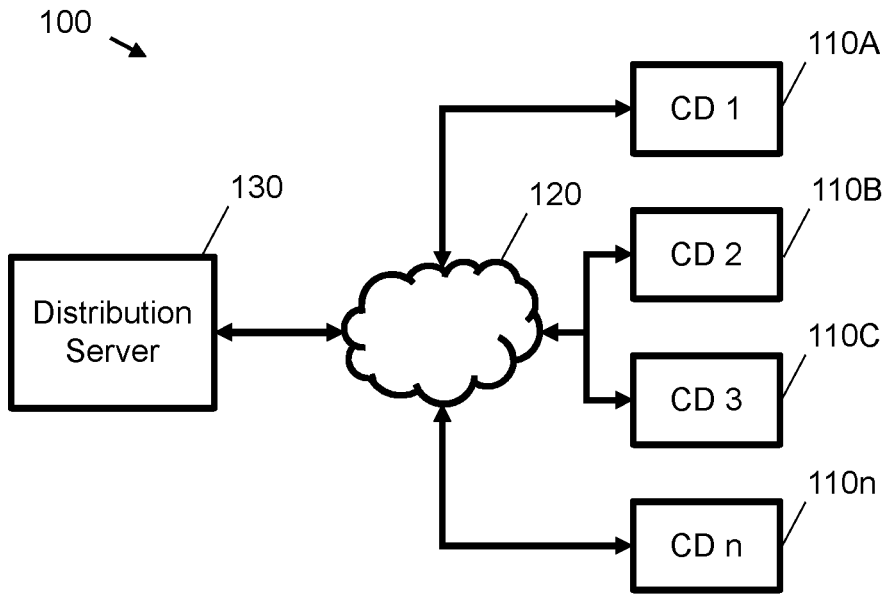
FIGS. 1A and 1B are schematic diagrams of two example networks.

Certain examples described herein address a challenge of latency for collaborative sessions. This is achieved by stabilising latency such that a global latency value is enforced for at least a portion of the collaborative session. This global latency is fixed, i.e. constant, for at least the portion of the collaborative session. Artificial latencies ("delays") may be applied dynamically, e.g. may be updated throughout the collaborative session, to accommodate variations in at least network latency during the session. Nodes or client devices in these examples thus receive synchronised data streams that are delayed by a time period equal to the global latency.

In certain examples described herein, three types of latency are considered.

A system latency comprises a delay incurred due to data or signal processing, e.g. including capture, conversion, pre-processing, quantisation, and/or sampling delays (as examples). System latencies may depend on: utilisation of one or more processors (e.g. central processing units, graphical processing units and/or digital signal processors); the particular hardware devices being used (e.g. analogue-to-digital converters, encoders, input/output interfaces, etc.); and read/write times to memory, buffers and/or storage devices. System latencies may also occur when preparing data for transmission or when processing data from a network. System latencies may be incurred at client devices and/or intermediate devices such as distribution servers.

A network latency comprises a delay incurred due to transmission of data over one or more network connections. For example, a network latency may be incurred when transmitting a data stream between two client devices. Network latencies may vary due to time of day, network traffic, and/or ambient conditions, as examples.

Certain examples described herein, measure one or more of the system latency and network latency for each client device in a group of collaborating nodes. One or more of the system latency and the network latency may be considered a general "latency" for a given client device. In certain examples described herein, an artificial latency is determined, which is applied to a data stream as a third form of latency. An artificial latency may be updated based on ongoing measurements of at least network latency. In one case, an initial measurement of system latency may be measured and used in the computation. An artificial latency may be modified (i.e. updated during the collaborative session) to offset differences in the system latency at each client device, and/or network latency between sending and receiving client devices. This then enables a constant global latency to be enforced, i.e. allows a given end-to-end delay to be set between capture of data and reproduction. For example, a global latency may be set as, for a given client device, the sum of the system latency, the network latency and the artificial latency for the device.

In certain examples, the global latency is set to be at least a longest latency for the set of client devices engaging in the collaborative session. This may be a longest system and/or network latency for a data path between two client devices.

It has been found that collaboration is possible when the global latency is fixed as a function of a temporal rate for a series of temporally-coordinated events that define the session. For example, the temporal rate may be a tempo in a musical performance session, or a visual update rate such as a rate of movement in a video game or dance performance. The function may set the global latency as a multiple of a time period associated with the temporal rate, subject to the longest latency constraint. For example, this may be a time period for a non-zero number of beats associated with the tempo of a musical performance, and/or a non-zero number of visual updates, e.g. block rotations or polygon updates in a computer game or the time period for performing a particular number of body movements in a dance or theatrical performance. The temporal rate may be measured in Hertz or as an impulse rate or using other measures. Multiple constraints may be applied to the global latency. This typically sets the global latency to a value that is greater than a longest latency for the client devices and may lead to a global latency that is much greater than a perceptible period, e.g. be on the scale of 500 ms for one beat at 120 beats per minute. However, by being set as a function of the temporal rate, and being a stable value, it becomes possible to successfully collaborate. Indeed, in experiments, performers that were captured by a client device were unaware of any difference in how a performance was performed.

Certain examples described herein provide a technical solution to challenges in collaborative performance over a network. These examples address challenges in, for example, the fields of live sound engineering and network communications. Certain examples provide a method and a system that: works over the types of bandwidths available in community contexts; that may be applied over any geographical distance; that avoids a requirement for rare high-speed backbone connections; and/or that enables a standard process of performance on the part of those being captured by the client devices. In the latter case, in a music performance context, instrumentalists may simply play their part in the performance, as notated by a score. Given that the global latency is predefined and is stably enforced throughout at least a portion of the collaboration session, a score may be composed that accommodates the delay on a set of synchronised data streams experienced by each client device. Additionally, as one or more global latencies for the collaboration session may be predefined, a simulation platform may be provided that allows content generators, such as composers, to present the content as it would be experienced by the plurality of client devices engaging in the session.

Certain examples described herein differ from comparative systems, e.g. such as those described above. Although certain comparative systems delay data originating from other client devices over a network, they do not specify a global latency to use across a complete set of client devices that are both sending and receiving data during the collaborative session. Moreover, certain comparative systems teach away from increasing a delay beyond a noticeable value, e.g. 30-60 ms, as it is appreciated that the collaborative session collapses if that occurs. One feature that contributes to the collapse in these comparative systems is the variability in delays applied across the set of client devices; for example, as a longest latency changes due to network effects and traffic, the delays in these comparative systems also change.

Certain comparative systems also address the challenge of latency by applying different local delays, e.g. such that local events at a client device are synchronised, but without a global synchronisation across all the client devices engaging in the collaboration session (i.e. each client device will present content at a different time). This is taught as it provides an advantage of reducing delays for client devices that are coupled to fast connections, e.g. as only the effect of latencies local to the particular client device are taken into account. Delays need to be reduced in these comparative systems to below the noticeable threshold. Indeed, certain comparative systems ignore data that requires a delay above the noticeable threshold. However, this means that the comparative solutions tend to be unsuitable for a set of client devices with heterogeneous connection types and properties. Experiments with such systems indicate they are designed to work over short network connections where the latency is below the noticeable threshold. Moreover, these comparative systems teach performance "in time" with the latency inherent in the system during a given performance (sometimes referred to as playing "ahead of" the beat, i.e. playing to an assigned tempo but with variation due to latency). This is particularly difficult for amateur musicians to achieve in a consistent manner.

Figure 1B:
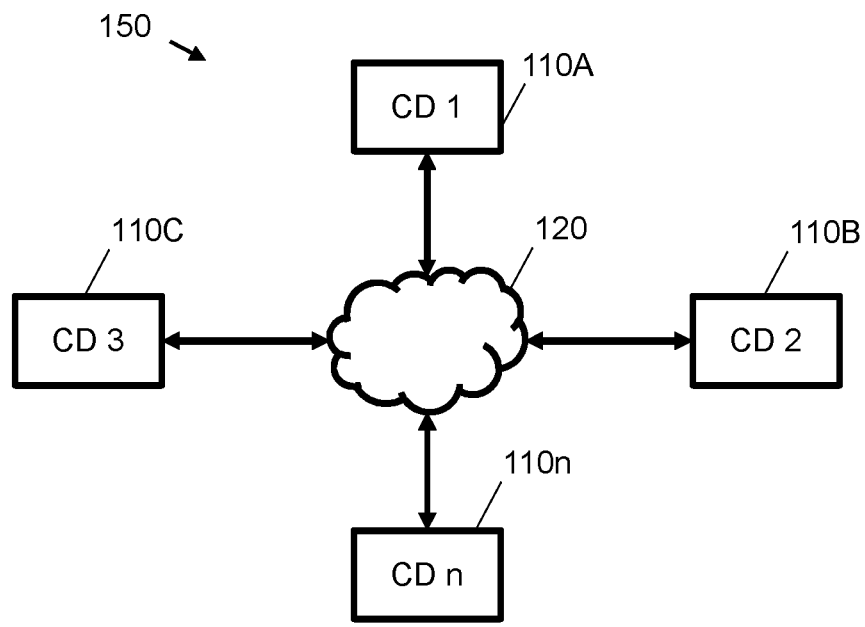

FIGS. 1A and 1B show two example network configurations 100, 150 that may be used with the examples described herein. It should be noted that these configurations have been simplified for ease of explanation; many intermediate devices such as routers and gateways have been omitted for clarity.

FIG. 1A shows a first network configuration 100 comprising a plurality of client devices 110 that are communicatively coupled to a network 120. The first network configuration 100 also comprises a distribution server 130 that is also communicatively coupled to the network 120. As such, the client devices 110 and the distribution server 130 may send and/or receive data across the network 120. As described further below the client devices 110 and the distribution server 130 may send and/or receive data to provide a collaboration session over the network 120. The distribution server 130 is so-called as it operates to route and "distribute" data between the client devices 110. For example, the distribution server 130 may receive a data stream from each of the client devices 110 and then transmit that data stream to each of the other client devices 110 in the set (e.g. from 110A to 110B-110n). In FIG. 1A, four client devices are shown 110A-110n; however, in practice any number of two or more client devices 110 may engage in a collaborative session. In certain examples, the distribution server 130 may itself be a client device that sends and receives captured data.

FIG. 1B shows a second network configuration 150 that may be used as an alternative to the first network configuration 100. The second network configuration 150 is a peer-to-peer configuration wherein each of the client devices 110 is coupled to each other via the network 120 without the presence of a central server such as distribution server 130.

Although the network 120 is shown as a single entity, those skilled in the art will appreciate that it may in practice be implemented with one or more networks that are communicatively coupled. For example, the network 120 may comprise any combination of wired and/or wireless networks, and may comprise local area networks (LAN) and/or wide area networks (WAN). In certain implementations, one of the networks may comprise a collection of public networks such as "the Internet". Network connections may be secured or unsecured. In certain cases, network connections may comprise a virtual private network connection. The network 120 may comprise intermediate network devices such as routers, switches, servers etc.

In implementations, the network connections between the network 120 and the client devices 110 may have a variety of properties, e.g. form a set of heterogeneous network connections. Each of the client devices 110 may be in a geographically unique or independent location; this may influence the network connection properties. For example, network connections may be one or more of (amongst others): a connection to an Internet2, JANET or GEANT hub; a Digital Subscriber Line (DSL) connection (e.g. asynchronous or very-high-bitrate); a Fibre To The x (FTTx) optic fibre (broadband) connection; a power line connection; a cable connection; and a satellite or other wireless connection (e.g. 3G/4G, radio or Worldwide Interoperability for Microwave Access—WiMAX). Network connections may have different upload and download speeds. Download speeds may be on the order of Mbps or Gbps. In test implementations a common download speed for a community network connection varied from 2 to 70 Mbps. A common upload speed for a community network connection varied from 2 to 20 Mbps. However, these speeds were found to vary considerably between connections and even during a collaborative session. Certain examples described herein may be implemented over network connections where the last kilometre or so of the connection is made over legacy copper wires. These speeds and connections are typically not suitable for comparative telematic performance systems, which require high Gbps connections to fast backbone systems (with speeds of 100 s of Gbps). In a preferred implementation, a site with a higher network connection speed for a group of network devices engaging in the collaborative session may be selected to implement the distribution server 130.

Figure 2:
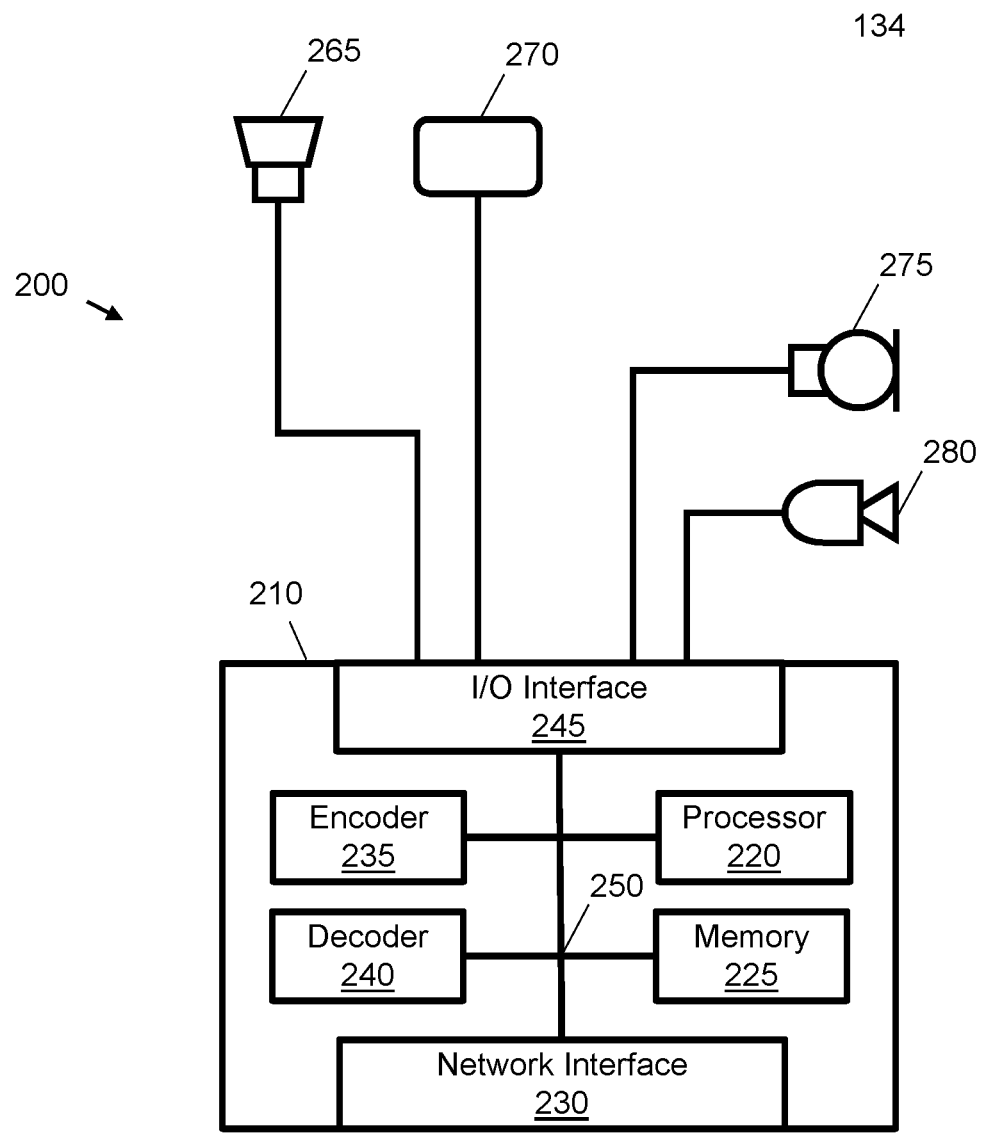
FIG. 2 is a schematic diagram of a client device according to an example.

FIG. 2 shows an example client device 200. The example client device 200 may implement one of client devices 110. Client device 200 is shown as an example; other client device configurations may also be used. Certain features have been omitted for clarity of explanation.

Client device 200 is a computer device that comprises a processor 220, a memory 225, a network interface 230, a data stream encoder 235, a data stream decoder 240, and an input/output interface 245. In FIG. 2, these components are coupled by a systems bus 250. Client device 200 may comprise, amongst others, one or more of: a server (e.g. headless) computing device, a desktop computing device, a laptop, an embedded device (e.g. within an audio/video mixing desk), a smartphone, and a tablet device. The processor 220 may comprise one or more central and/or graphical processing unit. The memory 225 may comprise volatile and/or non-volatile memory, such as, amongst others, random-access memory, solid state memory, magnetic disks, and optic disks. Memory 225 may comprise a plurality of storage devices. The network interface 230 may comprise one or more of: a wired network interface such as an Ethernet connection and a wireless network interface, such as a WiFi or mobile radio transmitter. In certain examples, the network interface 230 may comprise a modem to access a digital subscriber line or the like. The system bus 250 may comprise one or more interconnected serial and/or parallel data communication systems. The encoder 235 and decoder 240 may comprise hardware media encoders and decoders and/or encoders and decoders implemented as computer program code stored in memory 225 that is implemented by processor 220.

In FIG. 2, the input/output interface 245 is communicatively coupled to a number of input devices and a number of output devices. The input devices comprise a microphone 275 and a video camera 280. The output devices comprise a speaker 265 and a display 270. Although these devices are shown for example, it should be noted that implementations may use additional, different and/or fewer devices. For example, any audio transducer may be used to present an audio signal and any visual transducer may be used to present a video signal. In certain cases, the input and output devices may be integrated into the client device 200, e.g. they may comprise integrated components of a smartphone or tablet. In other cases, the input and output devices may comprise external devices such as external microphones, projectors, public address systems etc. The input/output interface 245 may comprise an internal system bus interface and/or an external hardware interface, such as a Universal Serial Bus (USB) interface, optical sockets and/or coaxial sockets. The input/output interface 245 may comprise a combination of internal and external devices, e.g. external mixing elements that are coupled via USB.

For certain telematic performances, a client device 200 may be installed to capture audio and/or visual input from a plurality of performers. In this case, the input/output interface 245 may comprise mixers or multiplexers to couple the client device 200 to arrays of microphones and/or video cameras. Each input device in this case may be assigned to one or more audio/visual channels. In certain implementations there may be one or more intermediate data processing devices between the input/output interface 245 and the input/output devices, such as filters, amplifiers, mixers etc. Signals from the input devices may be balanced and/or panned in certain implementations. In one case, the input/output interface 245 may comprise separate audio and video interfaces.

The microphone 275 may comprise any of a variety of microphone types. For example it may comprise: a dynamic stage microphone, e.g. with a cardioid polar pattern; a super-cardioid, clip-on microphone; or small diaphragm condenser microphone. A microphone 275 may be located on, or in proximity to, each performer in a collaborative session such as a telematic performance; or one microphone 275 may capture audio from a plurality of performers. A number of microphones 275 may be mixed into one or more audio streams. The speaker 265 may comprise an array of loudspeakers. Speaker type and model may be selected based on acoustic specifications for an implementation. The display 270 may comprise an array of monitors and/or television screens. Different display configurations may be possible. For example, for a musical performance there may be: a single, large projection screen, containing a large image of the conductor and small tiles of multiple musicians to the side; a single, large projection screen, split into equal quadrants, containing equal-sized images of the conductor and multiple musicians; multiple large projection screens, with each screen dedicated to a video feed of one of the other client devices; or multiple flat-screen televisions, with each screen dedicated to the video feed of one of the other client devices. One or more cameras 280 may be provided. In one case, the input/output interface 245 may comprise implement the Serial Digital Interface (SDI) standard. The resolution and frame rate may be configured depending on a system implementation. One client device 200 may capture multiple video streams, wherein each video stream may be compressed at a predefined level.

In use, the client device 200 captures one or more audio data signals, via the microphone 275 and the input/output interface 245, and one or more video data signals, via the camera 280 and the input/output interface 245. In certain cases, only audio or only video may be captured, depending on the performance. The encoder 235 then creates one or more data streams from the captured data signals. The encoder 235 may generate separate data streams for audio and video. There may be multiple data streams for each of audio and video data. The encoder 235 may be configured to encode video data at a particular resolution and bit rate. In one case, the encoder 235 may form part of the functionality of the input/output interface 245 or an external device, e.g. a USB audio capture device may take an input from the microphone 275 and generate an encoded audio stream for transmission. The encoder 235 may comprise separate devices or modules for each of the audio and video data. The encoder 235 may also compress audio and/or video data to generate audio and video data streams. In one case, a configuration may be determined for the plurality of client devices 110, setting compression and bit rate levels. In other cases, the encoder 235 may adapt encoding and compression to network conditions. In certain cases, the encoder 235 may be configured to generate at least uncompressed audio feeds. Data streams from the encoder 235 may then be available for transmission over the network interface 230. This may be performed under the control of computer program code stored in the memory 225 that is executed by the processor 220. Data streams may comprise one or more audio channels and/or video camera channels.

In a similar manner to the encoder 235, the decoder 240 receives one or more data streams via the network interface 230 and decodes these streams to allow presentation on a local output device via the input/output interface 245. The decoder 240 may generate separate outputs for audio and video, or may generate a single mixed audio and video output. These may be digital or analogue outputs. There may be multiple outputs for each of audio and video data. In one case, the decoder 240 may form part of the functionality of the input/output interface 245 or an external device, e.g. a data stream may be passed via a USB coupling to an external video decoder device that outputs a High Definition Multimedia Interface (HDMI) signal for a display device. The decoder 240 may comprise separate devices or modules for each of the audio and video data. If the data streams are compressed, the decoder 240 may also uncompress audio and/or video data to generate audio and video outputs. Output from the decoder 240 may be sent as a set of digital signals to the input/output interface 245.

It should be noted that FIG. 2 shows a client device 200 as an example for the further explanation below. In certain examples, the client device 200 may capture data in the form of keyboard or other user interface input that is transmitted as a data stream, i.e. a sequence of data entries over time, via the network interface 230. In other example, the data may comprise direct input from a musical instrument, e.g. a stream of Musical Instrument Digital Interface (MIDI) data. Data streams may also multiplex a combination of different data sources, and/or a bundle of data streams may be transmitted concurrently. For example, a pre-recorded audio and/or video stream such as a backing track may also be included.

Figure 3:
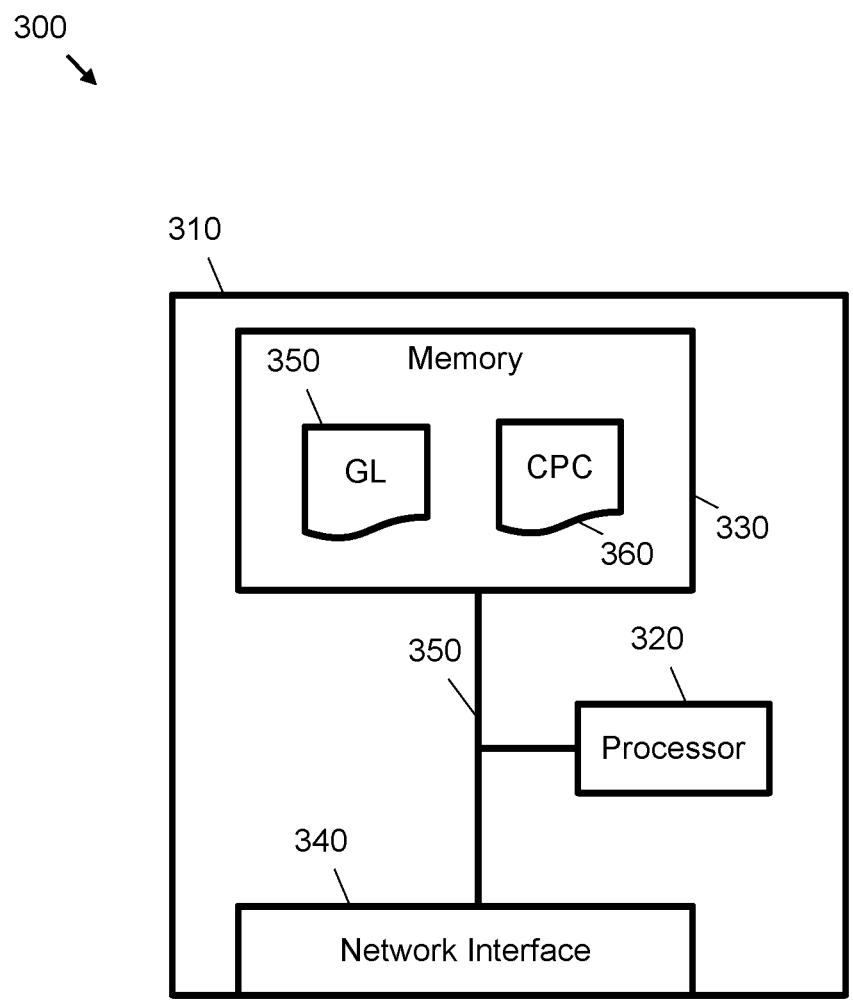
FIG. 3 is a schematic diagram of a distribution server according to an example.

FIG. 3 is a schematic diagram of a distribution server 300 according to an example. The example distribution server 300 may implement distribution server 130. Distribution server 300 is shown as an example; other client device configurations may also be used. Certain features have been omitted for clarity of explanation.

Like the client device, the distribution server 300 comprises a processor 320, a memory 330 and a network interface 340. These components are coupled by a system bus 350. The processor 320 may comprise one or more central and/or graphical processing unit. The memory 330 may comprise volatile and/or non-volatile memory, such as, amongst others, random-access memory, solid state memory, magnetic disks, and optic disks. The memory 330 may comprise a plurality of storage devices. The network interface 340 may comprise one or more of: a wired network interface such as an Ethernet connection and a wireless network interface, such as a WiFi or mobile radio transmitter. In certain examples, the network interface 340 may comprise a modem to access a digital subscriber line or the like. The system bus 350 may comprise one or more interconnected serial and/or parallel data communication systems. In one example, the distribution server 300 may also comprise certain elements of client device 200 and act to capture and present a set of data streams at one of the locations forming part of the collaborative session (i.e. the distribution server 300 may form one of the plurality of client devices engaging in the collaborative session).

In FIG. 3, the network interface 340 is configured to receive data streams from each of a plurality of client devices engaging in a collaborative session, to process the data streams, and then to forward appropriate data streams onto each client device. This operation is described in more detail with reference to the examples of FIGS. 5A to 5C.

The memory 330 of distribution server 310 stores a global latency 350 and computer program code 360. The global latency 350 is a value (e.g. an integer or float value) that represents a global time delay that is enforced for data streams being supplied to the client devices as part of the collaborative session. The global latency 350 may be enforced by adding artificial latencies (i.e. delays) to the data streams. Adding delays (i.e. delaying) the data streams ensures that an end-to-end latency for a data stream between a set of two client device is set to a fixed value, wherein this fixed value applies to all the client devices. The computer program code 360 is a set of instructions that are executable by the processor 320 to implement the server functionality of the distribution server 310. For example, the computer program code 360 comprises instructions to add delays to the data streams received via the network interface 340 to enforce the global latency, and to transmit the delayed data streams to the plurality of client devices via the network interface 340 such that the data streams are presented via the client devices in synchrony with an end-to-end time delay set by the global latency. Further detail of how this is performed is described below.

Figure 4:
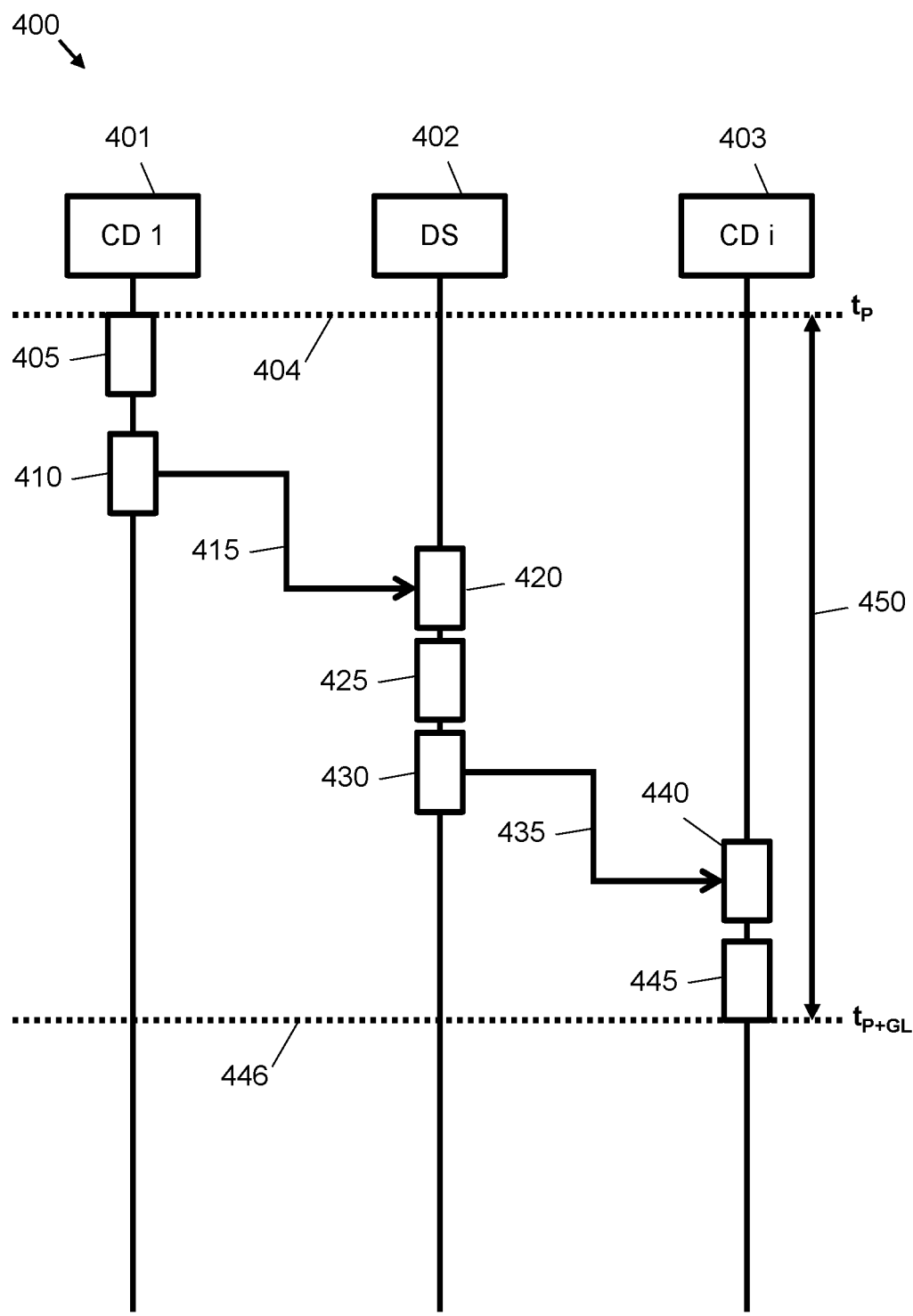
FIG. 4 is a sequence diagram showing an example interaction between a set of client devices and a distribution server.

FIG. 4 is a sequence diagram that shows an interaction 400 between a first client device 401 and a distribution server 402 according to an example. This interaction 400 may take place in the context of the network configuration of FIG. 1 and the devices may have the structure shown in FIGS. 2 and 3. The interaction 400 involves receiving a data stream from the first client device 401 and distributing that data stream to a second client device 403.

The interaction 400 begins as a time, $t_p$, indicated by line 404. In FIG. 4, time passes vertically down the page. In this example, time $t_p$ may represent when at least part of an event occurs. The event occurs at the location of the first client device 401. The event may be the playing of a musical note, a movement in a dance performance or a word spoken in a theatrical performance. Following the event, data associated with the event is captured at the first client device 401 and a data stream is generated. This is shown as process 405. With reference to FIG. 2, this may comprise the time taken for a sound wave to travel from an instrument to the microphone 275, be converted by the microphone 275 to a digital signal, be received over the input/output interface 245, and be encoded by the encoder 235 as an audio data stream. Similarly, it may comprise the time taken for light to travel from an object to the camera 280, be converted by the camera 280 to a digital signal, be received over the input/output interface 245, and be encoded by the encoder 235 as a video data stream. As shown in FIG. 4, a certain amount of time is required to capture and encode data at the first client device 401. Process 405 may involve a delay that forms part of a system latency.

Following process 405, the first client device 401 transmits the generated data stream to the distribution server 402. The data stream may be transmitted using any suitable communications protocol, such as User Datagram Protocol (UDP) or Transmission Control Protocol (TCP). The data stream may be transmitted over an Internet Protocol (IP) network. The process of preparing the data stream for transmission on the client device 401 is shown as 410 and the time required for the data stream to travel over the network is shown by arrow 415. At process 420 the data stream is received by the distribution server 402, e.g. at network interface 340 as shown in FIG. 3. Again the process 420 of receiving the data stream takes a non-zero amount of time.

According to the examples described herein, data streams are delayed to enforce a defined global latency. This is shown by process 425. The global latency is predefined and static for a time period covering the event, i.e. for a current portion of the collaborative session. The delay to add to the data stream, i.e. the time period indicated by the extent of process 425, may be defined dynamically based on a measured end-to-end latency between the first client device 401 and the second client device 403. For example, if a current measurement indicates that there is a first latency of $t_1$ ms between the first client device 401 and the distribution server 402, and a second latency of $t_2$ ms between the distribution server 402 and the second client device 403, and the global latency is set at $t_{GL}$ ms, a delay for the data stream may be calculated as $t_d = t_{GL} - t_2 - t_1$ such that $t_{GL} = t_1 + t_d + t_2$. The delay to may be computed for the particular transmitting and receiving set of client devices. In these cases, the first and second latencies may comprise a combination of system and network latencies.

Following the delay at process 425, the distribution server 402 transmits the data stream to the second client device 403 as indicated by process 430. This may be performed using network interface 340. Arrow 435 indicates transmission of the data stream over a network connection between the distribution server 402 and the second client device 403. Process 440 then indicates receipt of the data stream by the second client device 403, e.g. via network interface 230. Lastly process 445 indicates a time to decode the data stream and output the result via an output device of the second client device 403. For example, this may comprise decoding an audio and/or video stream and transmitting the resultant data to a speaker or display for presenting as audio or video. Line 446 thus indicates a time, $t_p + t_{GL}$, at which the content of the data stream is experienced by the performers at the location of the second client device 403. This time is equal to the time of the original performance, $t_p$, plus the time period associated with the global latency, $t_{GL}$. Time period 450 is thus equal to the global latency, $t_{GL}$.

The time for processes 405 and 445 may form part of a system latency, while the time for transmissions 415 and 435 may form part of a network latency. Depending on a measurement method, delays incurred due to processes 410, 420, 430, and 440 may in some cases be counted as part of a network latency and in other cases be counted as part of a system latency. In any case, the delays contribute to an end-to-end delay for a data stream. The process illustrated in FIG. 4 occurs in parallel for all combinations of client devices associated with the plurality of client devices that are engaged in the collaborative session. As such, time period 450 is constant for all pairs of client devices, e.g. would be the same for client device 110B transmitting a data stream to client device 110C or for the second client device 403 transmitting a data stream for receipt by the first client device 401 (i.e. the inverse of FIG. 4). At any one time, each client device receives and presents (i.e. outputs, renders or reproduces) a set of data streams from the other client devices in the plurality of client devices. This is shown in more detail in FIGS. 5A to 5C.

Figure 5A:
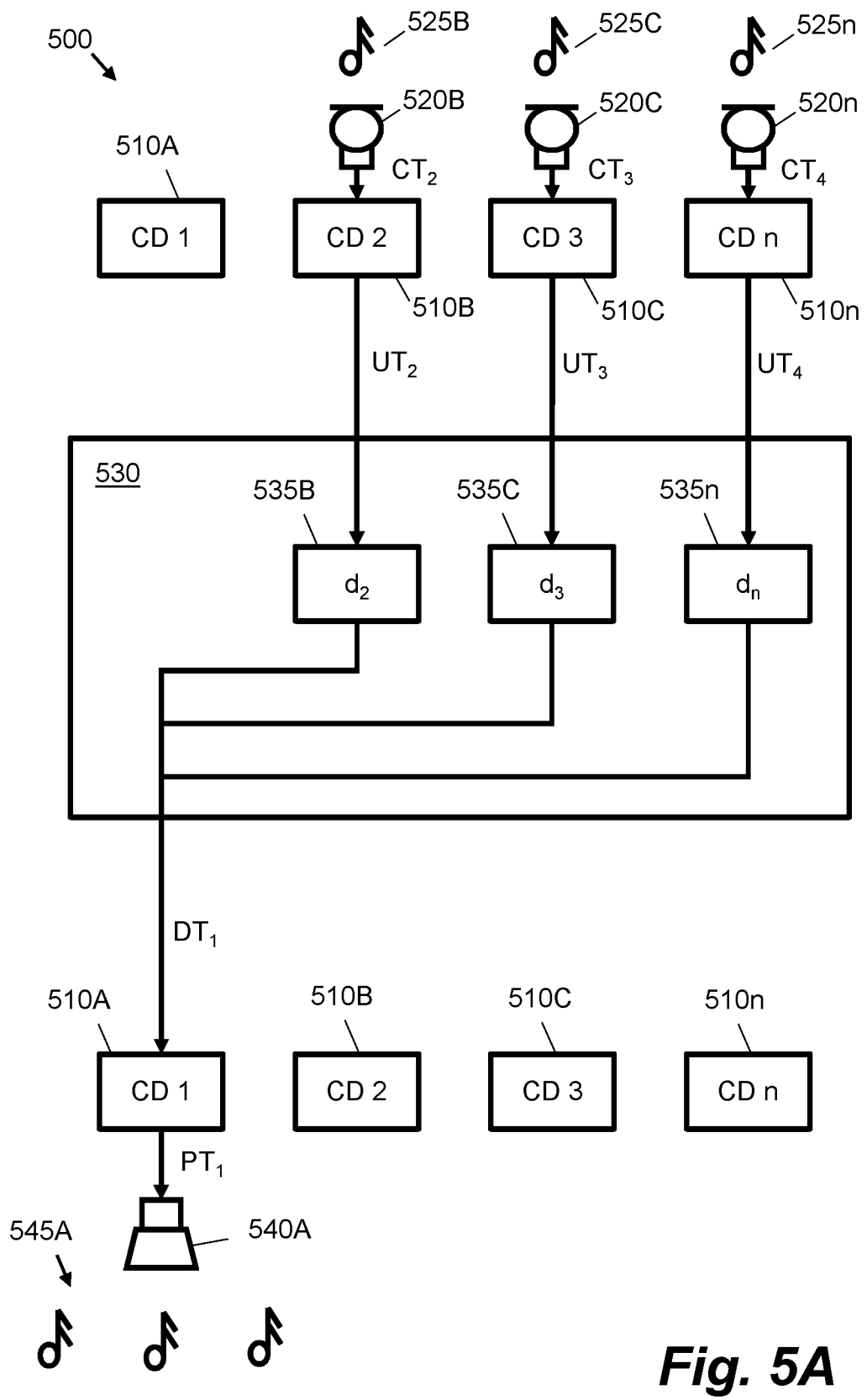
FIG. 5A is a schematic diagram showings a series of delayed audio streams being distributed to a particular client device according to an example.
Figure 5B:
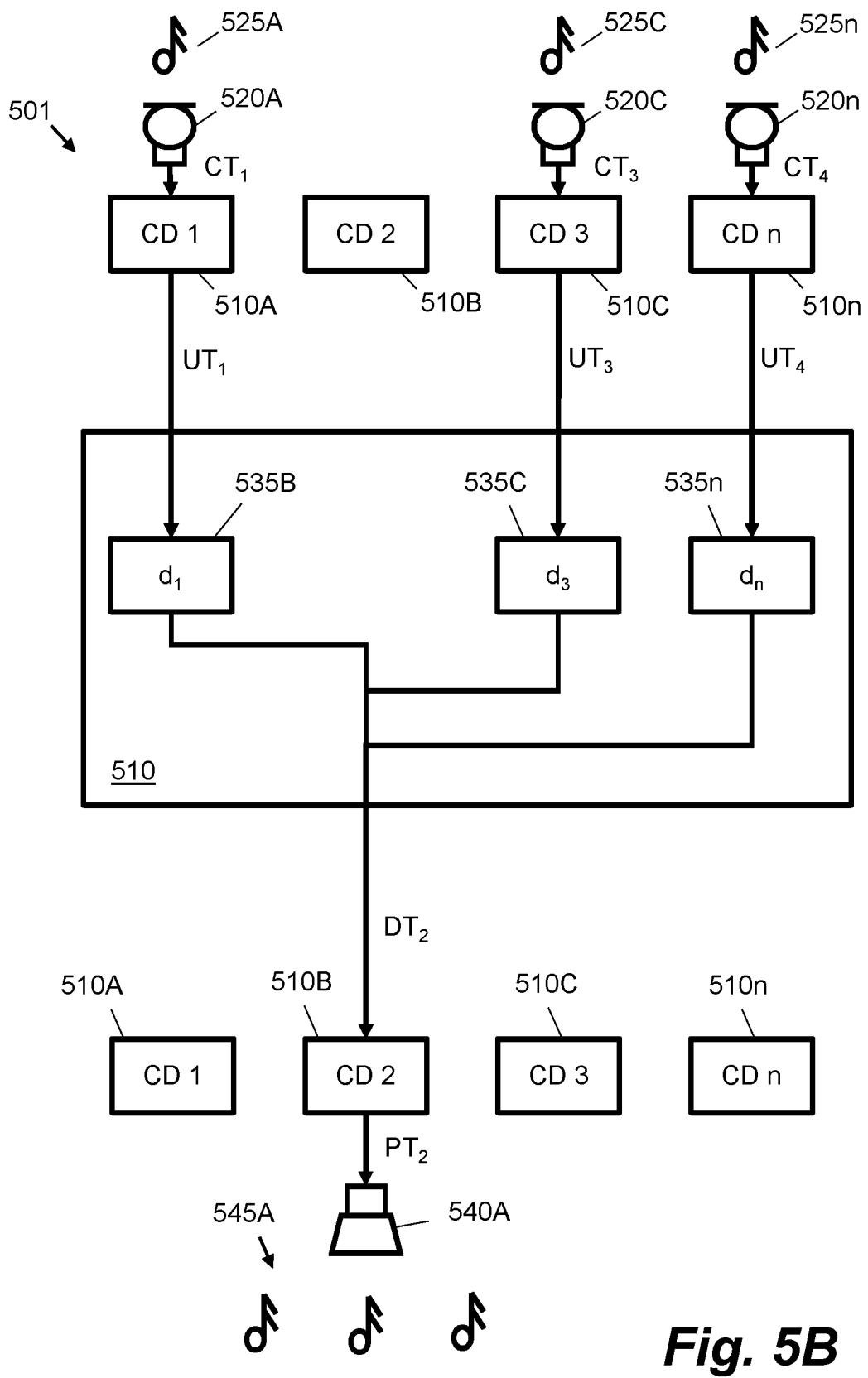
FIG. 5B is a schematic diagram showings a series of delayed audio streams being distributed to another client device according to the example of FIG. 5A.

FIG. 5A shows an example 500 whereby an audio data stream is distributed between client devices, wherein delays are added to enforce a global latency. FIG. 5A shows a plurality of client devices 510A to 510n that are engaging in the collaborative session. These may comprise client devices that are recording (i.e. capturing) and receiving data relating to a telematic performance. These may be implemented using the configuration shown in FIG. 2, or may use an alternative configuration. The set of client devices 510 are shown twice in FIG. 5A: at the top of the Figure they are shown capturing audio data and at the bottom of the Figure they are shown outputting audio data, i.e. relaying audio data from other locations. Additionally, for clarity, the example 500 only shows the transmission of data streams to a first client device 510A. However, it should be noted that in practice each client device will be capturing and presenting data; FIG. 5B for example shows the process of FIG. 5A as applied to present an audio signal at a second client device 510B. The processes of receiving and presenting data will also run together on each device (e.g. at least effectively in parallel through thread management), e.g. as shown later in FIG. 10.

In the example 500 of FIG. 5A, a set of client devices 510B to 510n that are not the first client device 510A are shown receiving audio data from respective microphones 520B to 520n. The microphones 520B to 520n in this example capture sounds 525B to 525n generated at each client device location. For example, each client device 510A to 510n may be located at a theatre or community centre to capture sound generated by a set of local musicians. Each set of local musicians may collaborate to perform a piece of music. There may be one or more musicians present at a location associated with a client device. As described with reference to FIG. 2, there may be more than one set of microphones per client device, and the process of receiving audio data from the microphones may comprise analogue to digital conversion (e.g. sampling and/or quantisation), mixing (e.g. of analogue or digital signals), encoding (e.g. as an audio data stream) and/or compression, amongst other audio processing operations. A configuration for encoding and compression may depend on a configuration of a client device (e.g. processor speed, bandwidth, buffer memory etc.). The time it takes to perform this audio processing to generate a data stream is shown in the Figure as capture time, $CT_i$.

Each client device 510B to 510n transmits the audio data stream generated from the captured audio to a distribution server 530. The distribution server 530 may be configured in a similar manner to distribution server 300 shown in FIG. 3. The distribution server 530 receives an audio data stream from each client device 510B to 510n and adds a delay to each stream at blocks 535B to 535n. In FIG. 5A, the time taken to transmit a data stream over a network connection between each client device 510 and the distribution server 530 is shown as an upload time $UT_i$. Blocks 535B to 535n may be implemented by a hardware or software implemented buffer that holds data from a data stream for a period of time defined by a supplied configuration parameter. In FIG. 5A, three delay values are shown: $d_2$, $d_3$ and $d_4$. The delay values for each data stream are calculated based on a set global latency that is obtained by the distribution server 530 and a set of measured latencies for the plurality of client devices 510A to 510n. The measured latencies may comprise both system and network latencies. At least network latencies may be measured during a collaborative session and used to update the delay values during the session.

Following the added delay at the distribution server 530, e.g. the holding of data for a predefined time period, the data streams are transmitted onto the first client device 510A. Transmission of the data streams over the network connection between the distribution server 530 and the first client device 510A is shown to take a download time $DT_i$. The data streams may be mixed by the distribution server 530 to form a single mixed data stream or may be transmitted separately. Whether the streams are mixed by the distribution server 530 may depend on the configuration of the receiving client device; e.g. if a client device comprises multiple loudspeakers separate audio streams may be transmitted that facilitates distribution. The first client device 510A receives one or more data streams, processes these streams and then presents audio data on one or more speakers 540A. This process takes a presentation time, $PT_i$. This results in the sounds 525B to 525n captured at the separate client devices 510B to 510n being presented as sounds 545A at the location of the first client device 510A. The time the sounds 545A are played will be delayed relative to the time at which the sounds 525B are generated. This delay is fixed by the distribution server 530 based on the defined global latency. In one case, the global latency sets a time period to fix the delay.

In the example of FIG. 5A, the distribution server 530 measures at least the upload transmission times $UT_i$ and the download transmission times $DT_i$ during the collaborative session, i.e. during the temporally-coordinated sound events 525B to 525n. These times may be referred to as network latencies. For example, the distribution server 530 may ping each client device 510A to 510n at a regular interval. The ping may enable the times $UT_i$ and $DT_i$ to be measured for each client device. The capture and presentation times $CT_i$ and $PT_i$ may be measured before the collaborative session, e.g. via a configuration period prior to the session, and/or during the session. In the former case, a test signal may be transmitted through the system path shown in FIG. 5A. This is described in more detail with reference to FIG. 6. In the latter case, the times may be measured using a process monitor running on the processor of the client device and/or monitoring data from hardware and/or software devices that process the audio data. The capture and presentation times $CT_i$ and $PT_i$ may be referred to as forming part of a system latency, i.e. a latency resulting from the hardware systems of at least the client device processing the audio data. In certain cases, the system latency may also take into account system latencies at the distribution server 530, e.g. any processing time involved in receiving, delaying and transmitting the audio streams.

In FIG. 5A, the distribution server 530 computes the delays $d_i$ as a function of the global latency, GL, and the measured latencies. This function may be a function of the global latency and both the network and system latencies. In a simple case for the configuration of FIG. 5A, $d_i = GL - (UT_i + CT_i) - (DT_i + PT_i)$. This may also be rewritten as global latency (GL)=artificial latency+system latency+network latency, where $d_i$ is the artificial latency, $(CT_i+PT_i)$ forms part of a system latency and $(UT_i+DT_i)$ forms part of a network latency. More generally, for a delay to be applied to a data stream from a client device i to be transmitted to a client device j, $d_{ij}=GL-(UT_i+CT_i)-(DT_j+PT_j)$. System latencies for the distribution server 530, $DS_{ij}$, may be further subtracted from this function. In certain cases, $DS_{ij}$ may equal a constant for all the data streams, i.e. DS. Variations to this delay calculation may also be introduced to model different elements of the network connection and processing path.

Figure 7:
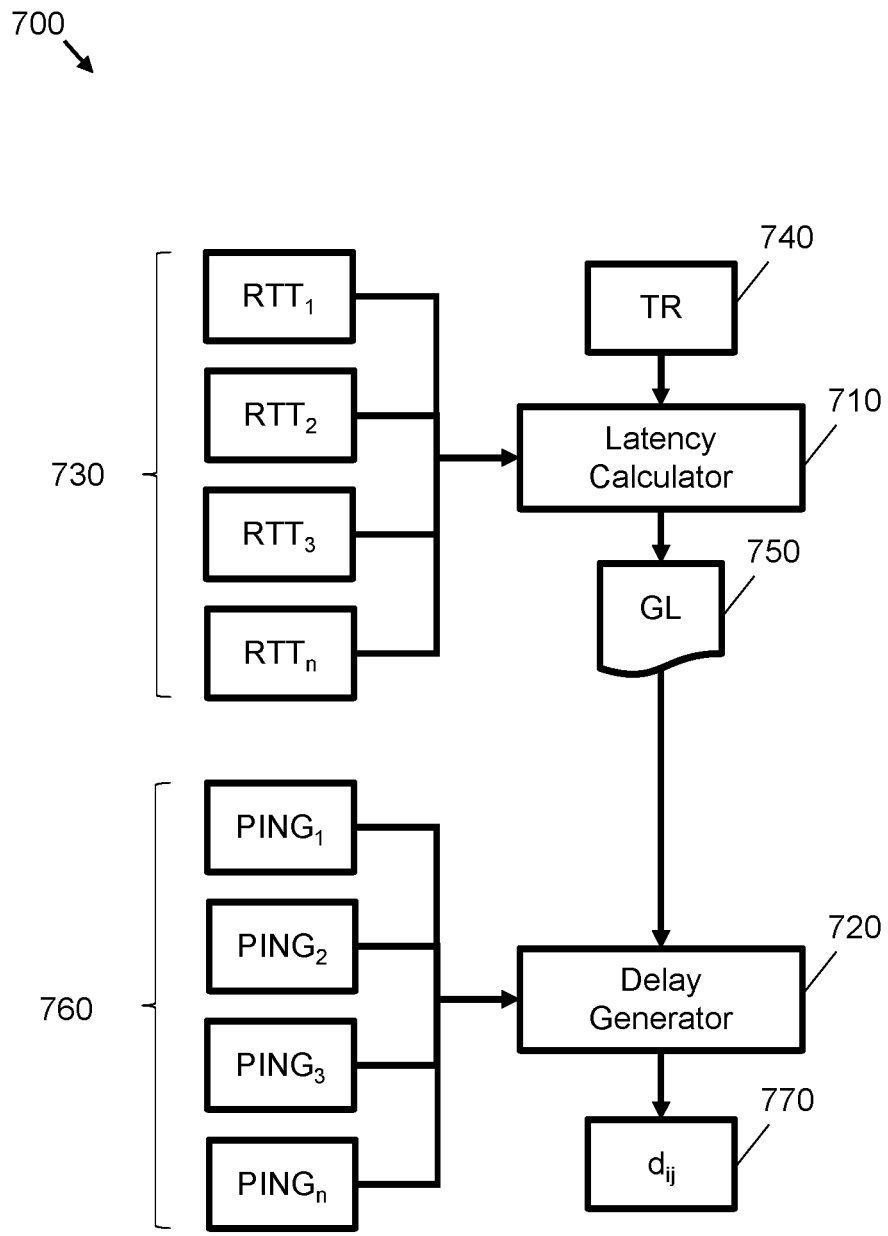
FIG. 7 is a schematic diagram showing a set of components for computing a global latency and a set of delays according to an example.

The distribution server 530 obtains a global latency that obeys a plurality of constraints. In one case, the distribution server 530 may compute the global latency as shown in FIG. 7. In one case, the global latency may be a non-zero multiple of a time period for a beat during at least a portion of the collaborative session (e.g. a beat based on a number of beats per minute (BPM) for a piece of music). This may comprise computing $\max(UT_i+CT_i)+\max(DT_i+PT_i)$ across the set of client devices. If a time per beat is equal to $t_b$, this may comprise computing $\operatorname{ceil}((\max(UT_i+CT_i)+\max(DT_i+PT_i))/t_b)$, i.e. selecting the nearest non-zero integer multiple (rounding up) of the time per beat that is greater than (or equal to) the longest latency between a slowest two of the client devices.

As discussed above FIG. 5A shows a snapshot of a process where audio data is captured by a set of client devices 510B to 510n and is transmitted to a first client device 510A with an enforced global latency. During this process, the first client device 510A will also be capturing audio for transmission to the set of client devices 510B to 510n. In general, each client device will capture data for transmission to a set of other client devices engaging in the collaborative session and data from the set of other client devices will be presented by the client device. This results in all client devices presenting data or content from all other client devices in synchrony, where all client devices present the data based on the global latency. This may be explained with reference to FIG. 5B.

FIG. 5B shows the process of FIG. 5A as applied to the second client device 510B. This shows how, at the same time as the process of FIG. 5A is occurring, the first client device 510A will also be capturing data for transmission to other client devices. As such, all of the client devices 510A to 510n will reproduce sounds 545A (three sets in the Figures if n=3) from the other client devices at the same time, wherein a delay between the sound event and reproduction is set (e.g. is equal to) the global latency. Each client device thus experiences the events of the other client devices with a constant fixed delay. Because the delay is fixed based on a temporal rate for the events, the performers are able to work with the delay. This is not possible when the delay is not fixed based on a temporal rate and when the delay varies. In these cases, the collaborative session generally collapses as co-ordination becomes impossible. Additionally, as the global latency is known, stable and fixed, content may be designed with knowledge of the latency to accommodate the delay. This may further hide the presence of the delay.

Certain examples have been found to have a surprising effect with regard to participants in the collaborative session. Although comparative methods teach against adding noticeable delay, it was found that by having a "locked" or stable global latency that was the same for all participants and that was set based on a temporal rate of content, successful collaboration was possible and that participants were not aware of the latency.

Figure 5C:
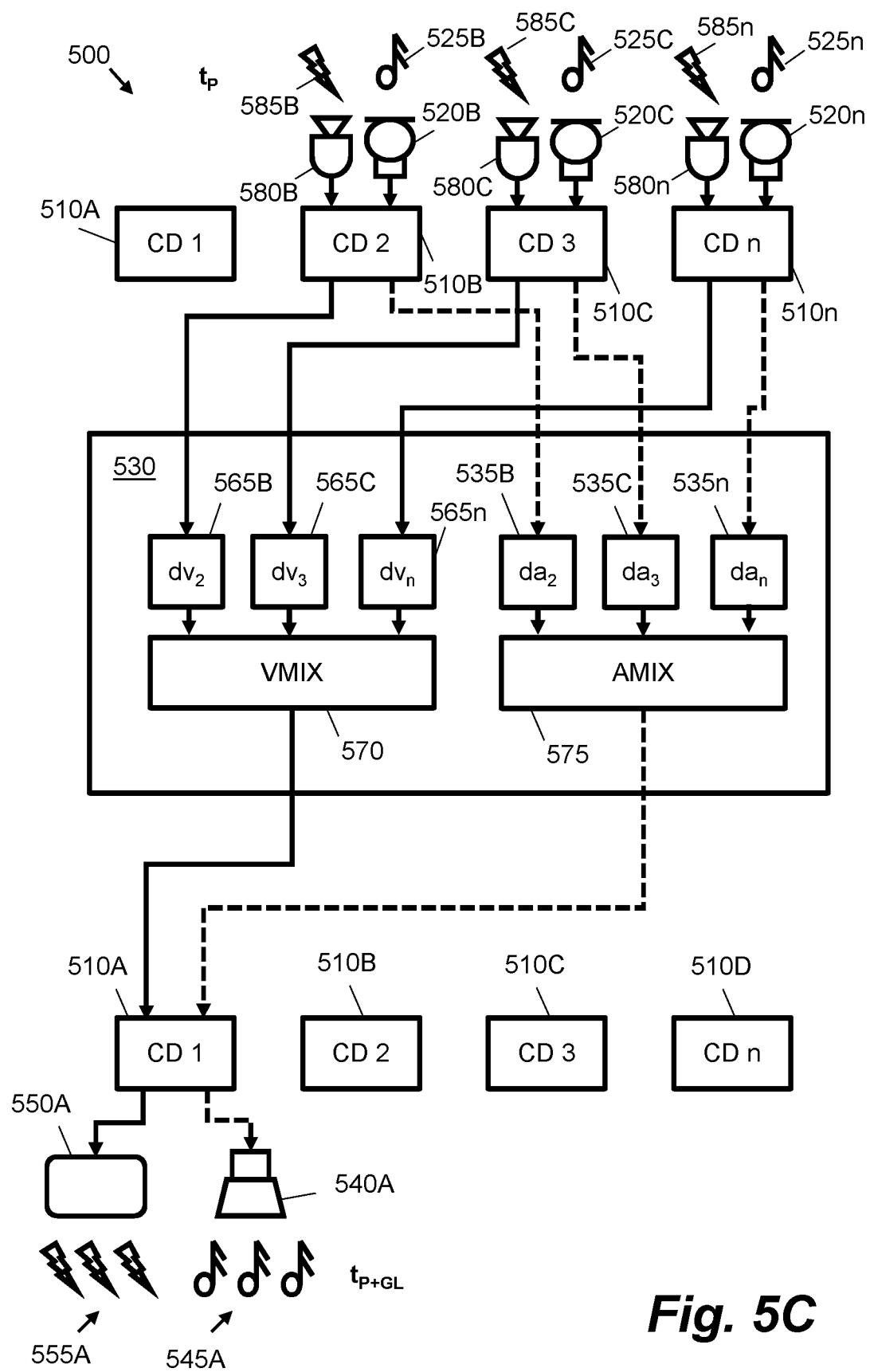
FIG. 5C is a schematic diagram showing the example of FIG. 5A extended to incorporate video streams.

FIG. 5C shows a variation of the example 500 of FIG. 5A. In this variation both audio and video data is captured. The video data is captured and transmitted in a similar manner to the audio data in FIG. 5A. As well as microphones 520B to 520n, each client device is coupled to a video capture device shown as cameras 580B to 580n. These cameras 580B to 580n are configured to capture visual events 585B to 585n at respective client device locations. As such each client device in the set of (other) client device 510B to 510n generates at least one audio data stream and at least one video data stream. Both sets of data streams are received by the distribution server 530. Delays in this example are added to each of the video and audio feeds. The example of FIG. 5C also shows how delayed data streams may be mixed or multiplexed for supply to the client devices. At the client device 510A video data is displayed on at least one display 550A such that visual events 585B may be experienced by participants local to client device 510A as visual events 555A. Similar to the audio events in FIG. 5A, the distribution server 530 adds delays to the data streams such that the video events are displayed based on a delay set by the global latency. As such, the presentation of the audio and video events is synchronised at the client device 510A. In FIG. 5C, the audio and video events 525 and 585 occur at a time $t_P$, wherein the events occur simultaneously at the geographically separated client devices 510. The same events are then presented by the first client device 510A at a time $t_{P+GL}$, i.e. the performance time plus the global latency.

In the example of FIG. 5C, delays, $da_i$, are added to the audio streams at blocks 535B to 535n as per the example of FIG. 5A. In addition, delays, $dv_i$, are added to the video streams at blocks 565B to 565n. The video delays are computed in a similar manner to the audio delays. In certain cases, the video delays may equal the audio delays. In other cases, the video delays may differ from the audio delays. This may be the case if the system and/or network latencies differ between the data types. For example, the process of acquiring video data and generating a video data stream may require a different amount of time to the process of acquiring audio data and generating an audio data stream. Similarly, system and network latencies may depend on client device configurations, e.g. one client device may transmit multiple video streams but one audio stream whereas another client device may transmit one lower resolution video stream with an uncompressed audio stream. As such, by measuring the delays (e.g. as per FIG. 6 below and/or by pinging network devices) these factors may be automatically taken into account without onerous configuration time. Moreover, the delay values applied at blocks 535B to 535n and 565B to 565n may vary throughout the collaborative session, e.g. due to changes in measured latency. By dynamically computing and varying the delays, e.g. based on updated network and/or system latency measurements, the telematic performance can accommodate changes in network speed due to network traffic and/or local computing factors (e.g. anti-virus software initiating a hard disk drive scan on a client device). Additionally, by selecting a global latency that is a larger multiple of the temporal rate, increased tolerance for such changes may be incorporated into the system. This, in turn, enables a live collaborative session to be held, for example, over long distances (e.g. hundreds or thousands of kilometres), over slow internet connection speeds (e.g. Mbps), and/or using older, less state-of-the-art computing hardware.

FIG. 5C also shows an example where the video and audio feeds are mixed following a delay. The video data streams are mixed by video mixer (VMIX) 570 and the audio data streams are mixed by an audio mixer (AMIX) 575. Data streams may be mixed such that a reduced number of digitalised data signals are generated and/or to multiplex multiple data streams within a reduced number of communication channels. In FIG. 5C, single video and audio data streams are sent to the first client device 510A. In other examples, the video and audio streams may not be mixed and may be communicated as per the audio data streams in FIG. 5A. Custom mixes may also be generated for each client device.

In certain cases, mixing may be performed before delay, such that a single delay is applied to the mixed data stream. In one case, the audio and video data streams may be mixed at the client device. In one case, each client device may generate a mixed audio/video data stream that is delayed. In yet another case, additional data streams may also be included in a mixed data stream. These additional data streams may comprise control signals (e.g. stage control signals, lighting signals, audio processing control signals, etc.), engineer communications (e.g. a voice communication channel to coordinate sound and video engineers across the different locations), MIDI data streams (e.g. from one or more electronic instruments) and/or user input data streams (e.g. keyboard and/or touch screen input). Additional data streams may be forwarded to the client device 510A or may be used to control the distribution server 530. In the latter case, control of the distribution server 530 may lead to the generation of a different additional data stream that is sent to the client device 510A as a separate or mixed stream.

Although the discussion of FIGS. 5A to 5C referred to audio and video "events" occurring at each client device there need not be actual events constantly occurring during the collaborative session at each client device. For example, content may require performers at one client device location to be quiet or still for a period of time. However, data is still captured by input devices coupled to the client devices during this period. As such, an event may include a period of silence or stillness.

Figure 6:
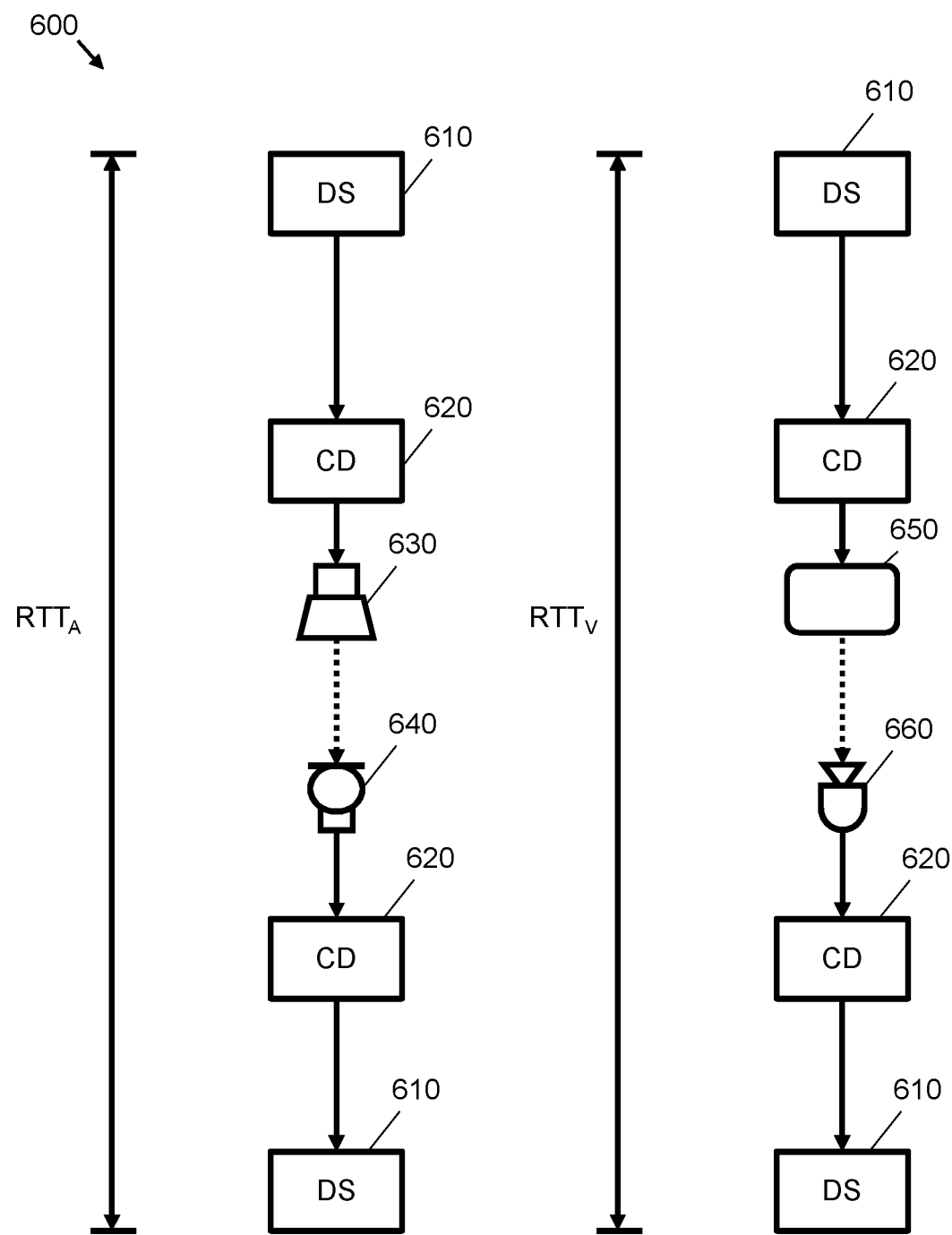
FIG. 6 is a schematic diagram showing a sequence for measuring a client device latency according to an example.

FIG. 6 shows an example 600 of how latencies may be measured. In particular, FIG. 6 shows how a calibration signal may be sent from a distribution server 610 to a client device 620 in order to measure system and network latencies. The left hand side of the Figure shows a measurement of audio latency and the right hand side of the Figure shows a measurement of video latency. These measurements may be generalised to other forms of data streams with suitable input and output devices.

In the left hand side example, an audio calibration signal is generated by the distribution server 610. This may comprise an audio impulse. In another case, it may comprise a predetermined waveform such as a sine or square wave. The audio calibration signal may be encoded as per audio data generated by a client device. In this case, the distribution server 610 may transmit the audio calibration signal to the client device 620 as an audio data stream as described in previous examples. The distribution server 620 stores a time when the audio data stream was transmitted. In FIG. 6, the client device 620 receives and decodes the audio calibration signal and sends it for playback on a local output device, in this case speaker 630. This is preferably the output device that is to be used for the collaborative session. In one case, this may comprise an array of speakers.

At client device 620, the audio calibration signal played by speaker 630 is captured by a local input device, in this case microphone 640. Again, during the calibration it is preferred that the input and output devices are arranged as they would be for the collaborative session. For example, microphone 640 may be one or more freestanding microphones, or a microphone worn by a test subject, wherein the microphone 640 is arranged to capture audio from the performance. The microphone 640 thus captures an output of the audio calibration signal which is received by the client device 620. The client device 620 processes the audio calibration signal as per the audio processing pipeline to be used for the collaborative session. This may comprise preprocessing, mixing, sampling, encoding and compression. The client device 620 then sends the captured audio calibration signal as an audio data stream back to the distribution server 610. The distribution server 610 may then store the time the audio stream is received. The distribution server 610 is then able to compute a round trip time for audio, $RTT_A$, based on the difference between the times the calibration signal was sent from, and received by, the server.

In one example, the audio calibration signal may also be used to determine audio quality settings for the collaborative session for the client device. A grid search or the like of a set of audio quality configuration values may be performed to determine a configuration that meets one or more audio quality thresholds. For example, the audio calibration signal may comprise a sine wave signal that is transmitted with a stable predetermined amplitude. The sine wave signal may be transmitted for a predetermined number of minutes (e.g. 2, 5 or 10). Modification of the signal that is received back at the distribution server 610 (e.g. amplitude variations or dropouts) may be used to evaluate audio quality. A minimum level of audio quality may be measured as a number of variations in amplitude (e.g. over a threshold) per time period (e.g. one variation per minute or two minute section). Audio quality settings (such as sample rate, compression rate, buffer size, number of audio channels, bit resolution etc.) that meet the minimum level of audio quality may then be selected for the collaborative session. These audio quality settings in turn influence the measured latencies and the computation of the global latency. The process may be repeated across the client devices to determine a set of audio quality settings for each device. For a high resolution audio signal, a starting point may be a sample rate of 44.1 kHz, a bit resolution of 16-bit and 2 channels (i.e. a stereo signal). Variations around this starting point may be computed based on audio tests (e.g. a particularly rural location may require a lower bit-resolution or mono channel.

The right hand side shows a similar process for a video calibration signal. In this case, the calibration signal may comprise a visual pattern such as a one or two-dimensional barcode, checkerboard or known television test pattern. The test pattern may be static (e.g. may be maintained during the measurement period) or may vary over time. The video calibration signal is again encoded and transmitted from the distribution server 610 to the client device 620 as a video data stream. Like the audio, the client device 620 receives the video data stream and displays the video calibration signal on at least one display 650. The client device 620 then captures an output of the display 650 using a video capture device 660 coupled to the client device 620. Again, this is preferably the same video capture device 660 that is to be used to capture video data for the collaborative session. In one case, the video capture device 660 may be directed at the display 650 (e.g. turned by hand or panned) to capture video data containing a representation of the video calibration signal. The video data is then processed and encoded as a video data stream by the client device 620. The client device 620 then transmits the video data stream to the distribution server 610 where a round trip time for the video calibration signal, $RTT_p$, may be computed by comparing the transmission and reception times.

In one case, network and system latencies for each client device may be computed as a function of the round trip times $RTT_j$. For example, a network latency may be measured and divided by two to estimate a one-way network latency. This may be subtracted from the round trip time measurements to provide an estimate for a system latency (including both capture and reproduction latencies). In certain cases, system latencies may be asymmetrical, e.g. an encoding time may be longer than a decoding time. A longest latency may be selected based on a longest round trip time, or computed as a function of the round trip times and measured network latencies. In certain cases multiple measurements of network latency may be used and combined (e.g. in a weighted sum or average). For example, network latencies may also be computed from the distribution server 610 by pinging the client devices 620. Using the network latencies measured with the round trip times, estimates for the system latencies of each client device may be computed (e.g. including $CT_i$ and $PT_i$ in FIG. 5A). The system latencies may be stored by the distribution server 610 in memory for later use in computing the delays for the collaborative session. For example, during the collaborative session, network latencies may be measured and combined with the stored system latencies to compute the delays, given a predefined global latency. Network latencies may be averaged during the collaborative session (e.g. an average of x measurements may be used, where x=10 in one example) to avoid temporary or transient variations in connection speed (e.g. short term jitter). This is described in more detail below with reference to FIG. 7.

FIG. 7 shows an example 700 comprising a latency calculator 710 and a delay generator 720. The example 700 will be used to explain how a global latency and a set of delays may be calculated according to one implementation. In other implementations, other configurations to compute these values may be used. The latency calculator 710 and the delay generator 720 may comprise hardware and/or software devices that are implemented in a client device or server, such as one of client devices 110 in FIG. 1B or distribution server 130 in FIG. 1A. These components may form part of the client device 200 and/or distribution server 300 shown in FIGS. 2 and 3. The example 700 will be described in the context of a musical telematic performance; however, the components and functions may be generalised to other forms of performance as described in more detail below.

In the present example, the latency calculator 710 receives a set of round trip times ($RTT_j$) 730. These round trip times may be measured according to the sequence depicted in FIG. 6. Round trip times for multiple data types may be received. The latency calculator 710 processes the round trip times to determine a longest latency for a plurality of client devices engaging in the collaborative session. In many cases, a slow connection will lead to both long upload and download times (i.e. there being correlation between upload and download speeds for a device), wherein upload times are often longer than download times. As such, a longest latency for the plurality of client devices may be taken as the maximum round trip time in the set of round trip times 730, as this is likely to be greater than combinations of one-way times between different clients (i.e. all other combinations of transmissions can be completed within this maximum round trip time). If there are wide varieties between upload and download times, then latencies may be measured for separate portions of an end-to-end network path to determine a longest latency (e.g. based on one-way ping times or synchronised upload/download tests). In other cases, an individual latency for a client device may be estimated as half the round trip time.

In the example 700 of FIG. 7, the latency calculator 710 receives a specification of a temporal rate (TR) 740. In one case this may be in the form of a beats-per-minute (BPM) value for the collaborative session. If the collaborative session comprises a musical performance with different portions or movements that have different BPMs then multiple BPM values may be supplied. For example, a BPM value may be 60, 120 or 180 BPM.

The latency calculator 710 of FIG. 7 receives the round trip time values 730 and the temporal rate value 740 and calculates a global latency value 750 for the collaborative session. If the collaborative session comprises a musical performance with different portions or movements and multiple BPM values are supplied, a global latency value 750 may be generated for each portion or movement (e.g. one value may apply for the first hour and another value for the second hour). The global latency value 750 may be stored in a memory of a distribution server. The global latency value 750 is calculated by the latency calculator 710 as a time period that based on the temporal rate 740 for the collaborative session and that is at least, or is greater than, a longest latency. This may be computed by selecting a lowest multiple of discrete change unit based on the temporal rate 740 that is greater than the longest round trip time 730. For example, if the temporal rate 740 comprises a BPM value, a discrete change unit may comprise a time period for one beat. For example, for BPMs of 60, 120 and 180, one beat may have a time period of 1 s, 500 ms or 333 ms. For a BPM of 120 and a longest latency of 125 ms, the global latency value 750 may be the time period for one beat, i.e. 500 ms. For the same BPM and a longest latency of 525 ms, the global latency value 750 may be the time period for two beats, i.e. 1 s. For a spoken word performance, a temporal rate may comprise an average number of words per minute. For example, a performance of Shakespeare may have 135 words per minute, and thus a period of 444 ms per word. For a video case, a temporal rate may comprise a rate of movement, e.g. an average time in the performance to move a unit distance such as a metre. For a computer game case, a temporal rate may comprise a weapon firing rate and/or a polygon update rate. In general, any temporal rate of a series of temporally-coordinated events that underlie the collaborative session may be used. The global latency value 710 is set to a non-zero multiple of a time period for each temporal unit as latencies of 0s are not possible.

In FIG. 7, the global latency value 750 is received by the delay generator 720 to compute a set of delays 720. A delay may be generated for each combination of sending (i) and receiving (j) client device, e.g. as $d_{ij}$. In certain cases, delays may be computed for individual streams, e.g. audio and video data streams may have different delays if they experience different latencies, such as different system latencies. In other cases, delays may be added to a combined audio/video data stream. The delay generator 720 computes the delays 720 to enforce the global latency value 750, i.e. to synchronise presentation of data streams received by a client device such that any end-to-end delay is (or at least instructed to attempt to be) equal to the global latency value 750. To do this the delay generator 720 uses measured latencies. In one case, this may comprise using the round trip times 730, e.g. to determine system latencies for the client devices. In FIG. 7, the delay generator 720 receives a set of network latency measurements (PING) 760, which it uses to compute the delays during the provision of the collaborative session. As discussed above, the network latency measurements 760 may be used together with system latency measurements computed from the round trip time estimates 730. In other cases, the delay generator 720 may also receive utilisation values from the client devices to determine system latencies, e.g. based on local tests during the collaborative session. The delay generator 720 may compute a delay value for capturing client device i and receiving client device j such that the end-to-end latency is equal to the global latency value 750, e.g. using a function similar to $d_{ij}=GL-(UT_i+CT_i)-(DT_j+PT_j)$ as described above. In tests, the network latency measurements 760 were found to vary during collaborative sessions more than system latency values; as such, updates to the delay values 770 may be computed at regular intervals based on network latency measurements 760 averaged over a time window (e.g. last x measurements). In one case, the delay values 770 may be continuously updated to take account of changes in network and/or system latencies. In general delay values 770, i.e. the set of artificial latencies, are updated a plurality of times during the collaboration session. This ensures that the global latency remains as a fixed time period despite underlying changes in connection characteristics.

Figure 8:
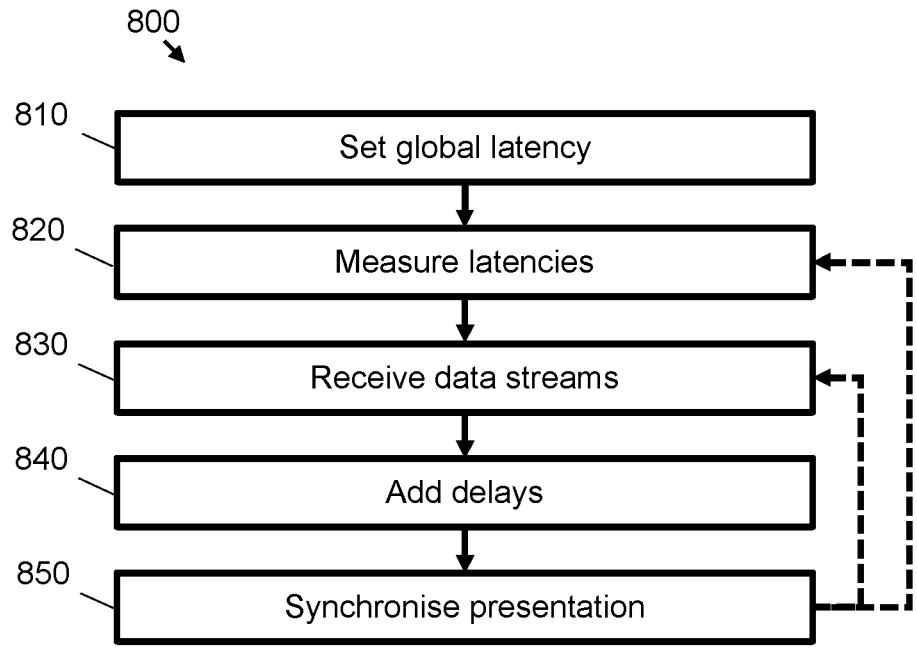
FIG. 8 is a flow diagram showing a method of providing a collaboration session according to an example.

FIG. 8 shows a method 800 of providing a collaborative session over a network. As per examples described herein, the collaborative session comprises a series of geographically-separated, temporally-coordinated events. These events occur in real-time at the different locations, i.e. during the collaborative session, although the presentation of captured events is delayed. The collaborative session may be live in that data streams containing data captured at locations engaging in the session are transmitted following capture, e.g. such that a maximum delay between an event occurring and an event being relayed at another location is set as the global latency. The term "live" does not mean that a data stream is received and/or transmitted instantaneously; it is delayed to enforce the global latency either locally at the sending or receiving client device, or at an intermediate device. In this way, the collaborative session may be distinguished from cases where data streams relate to data that is recorded at a time outside of the collaborative session such as a broadcast of a recording from a storage medium wherein the recording is often made months or years in advance. For example, the collaborative session may comprise, amongst others: a telematic performance featuring music, speech, dance or other action; an interactive guided tour, e.g. of a museum or historical site, where commentary may be provided by an expert remote from the museum or site; or an online computer game. The telematic performance may comprise a concert, a "gig", a play, a dance performance, a musical, a circus show etc. In general, a collaborative session may comprise any activity that involves time-based co-ordination. For example, activities may relate to operations that involve temporal precision in sound, visual or movement interaction in different geographical locations. These activities may relate to, for example: education (e.g. learning languages or speech therapy; learning performance arts; sports science activities such as interactive sports training); structural engineering (e.g. timed explosions in demolitions or timed structural loading); navigation; robotics training and/or interactions; or healthcare (e.g. telehealth and remote monitoring). The session is collaborative as participants at each of a plurality of geographically distinct locations may be captured and contribute to the session, said participants also receiving feeds from the other participants. Sites that are geographically separated may be located in different buildings, villages, towns, cities, counties, countries or continents.

Returning to FIG. 8, the method 800 comprises a first block 810 of setting a global latency for the collaborative session. This may comprise retrieving a pre-set value from memory, receiving a user-defined value via a user interface, and/or computing the value based on available data. In the latter case, a global latency may be computed based on tempo tracking and/or other temporal analysis of data being transmitted between client devices. The global latency is set to be equal to or greater than a longest latency for a plurality of client devices engaging in the collaborative session. It is also defined as a function of a temporal rate for the series of temporally-coordinated events. Block 810 may comprise checking that these constraints are met when retrieving or receiving a global latency value.

At block 820 latencies are measured for the plurality of client devices. This may comprise measuring network latencies as shown as 760 in FIG. 7 and/or measuring round trip times as shown in FIG. 6. The latencies measure at least a time to send captured data between sets of two client devices. Communication may take place via a distribution server 130 as shown in FIG. 1A, or via a peer-to-peer configuration as shown in FIG. 1B. Block 830 comprises receiving data streams for the collaborative session from the plurality of client devices. This may be performed at a distribution server or at a client device. Data streams may comprise audio and/or video data streams. At block 840, delays are added to the received data streams to enforce the global latency. This may comprise buffering a data stream, i.e. retaining data from the data stream in memory for a period of time before continuing processing. The delays at block 840 are computed as a function of the global latency and the measured latencies. Example functions are described above. Finally at block 850, presentation of the received data streams on the plurality of client devices is synchronised by way of the added delays. If a distribution server is used this may comprise transmitting delayed data streams to client devices for presentation on local output devices. If a peer-to-peer configuration is used, a set of delays may be applied locally at the receiving client device. In this latter case, a client device may receive delay values to apply, e.g. from a central server, or a client device may compute delay values themselves based on a received global latency value and a set of received latency measurements. In these examples, presentation occurs during capture of the data streams at the plurality of client devices, e.g. each client device is simultaneously capturing and presenting data so as to provide the collaborative session.

As shown by the dashed lines in FIG. 8 at least block 830 to 850 are repeated throughout time as data streams are captured and received. Block 820 may be repeated continuously or at intervals to adapt to changes in network characteristics. Perform block 820 there may be an initial process of measuring latencies, either similar to block 820 or the sequence of FIG. 6, in order to determine a longest latency to set the global latency at block 810.

In a peer-to-peer configuration, receiving data streams for the collaborative session from the plurality of client devices may comprise, at a given client device in the plurality of client devices, receiving a set of data streams for other client devices in the plurality of client devices, receiving data indicating the measured latencies for the plurality of client devices, and adding delays to the received set of data streams for other client devices to enforce the global latency. For example, using peer-to-peer messaging network latencies between devices may be measured and a global latency may be agreed upon or set by one of the client devices. As such, the functions for computing delay values may be applied locally at the client devices rather than remotely at a central server.

Synchronising presentation of the received data streams at block 850 may comprise at least one of: presenting a set of audio streams on each client device such that a time period between capturing audio data and presenting each audio stream is equal to the global latency; and displaying a set of video streams on each client device such that a time period between capturing video data and displaying each video stream is equal to the global latency. Examples of how this may be achieved are shown as FIGS. 5A to 5C. Audio and video data streams may both be delayed to enforce the global latency, wherein different delays may be applied to different data streams.

In one case, the collaborative session may comprise multiple sequences of temporally-coordinated events, where each sequence of temporally-coordinated events having a different temporal rate. This may be, for example, different musical movements, different songs at a performance, different scenes, different portions of a scene (e.g. monologue vs conversation), different levels of a computer game, and different dance acts, amongst others. In these case, setting the global latency may comprise setting a global latency for each sequence of temporally-coordinated events, wherein each global latency is greater than the longest latency for the plurality of client devices and is set as a function of the respective different temporal rates.

In the above case, a transition between global latency values may cause a discernible Doppler shift in output data (e.g. in continuous audio data such as when a ramp is used to change the delay time of the signal). As such a transition between global latency values may be enacted in a period or gap between segments or portions of a collaborative session, e.g. between songs or musical pieces. In one case, a transition between global latencies, e.g. for a shift from 120 BPM to 180 BPM (global latency of m*500 ms or m*333 ms), may be graduated, e.g. changed at a gradual rate over a given time period (such as 1 or 2 seconds), to prevent any discernible feature in the presented data streams.

Figure 9:
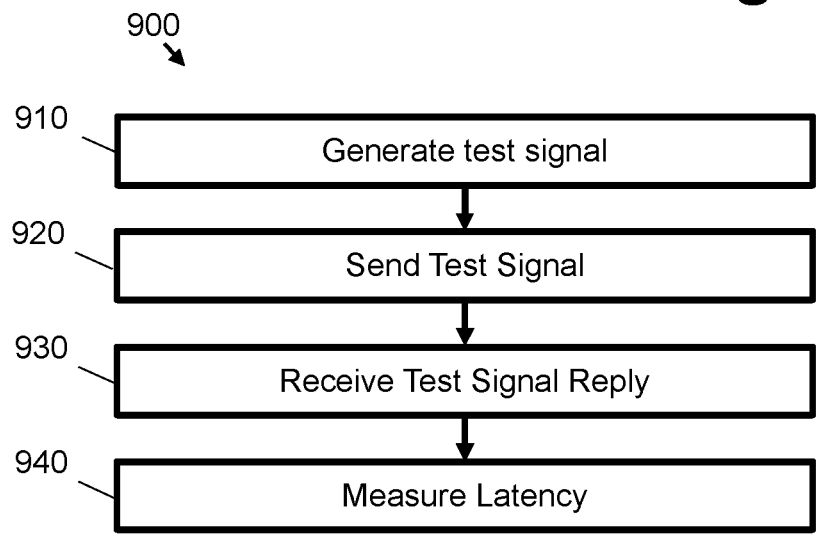
FIG. 9 is a flow diagram showing a method of measuring a client device latency according to an example.

FIG. 9 shows a method 900 of measuring latencies according to one example. At block 910 a test signal is generated. The test signal may be generated by a central server, such as distribution server 300, or by a peer client device. At block 920, the test signal is sent to at least one client device engaging in the collaborative session. Preferably, a test signal is sent to each client device engaging in the collaborative session. At block 930, a reply to the test signal is received. This reply may be received at either the central server or peer client device. At block 940, a latency such as a round trip time is measured based on the received signal.

The method of FIG. 9 shows a process that may be performed at a central server or peer client device. At a receiving client device, there may be the additional blocks of: outputting the test signal, e.g. using a local output device; capturing the test signal, e.g. using a local input device; and transmitting the captured test signal back to the central server or peer client device. FIG. 9 may thus form part of the sequence depicted in FIG. 6. The test signal may be one of: an audio impulse, an audio waveform with non-zero amplitude and a visual encoding.

Figure 10:
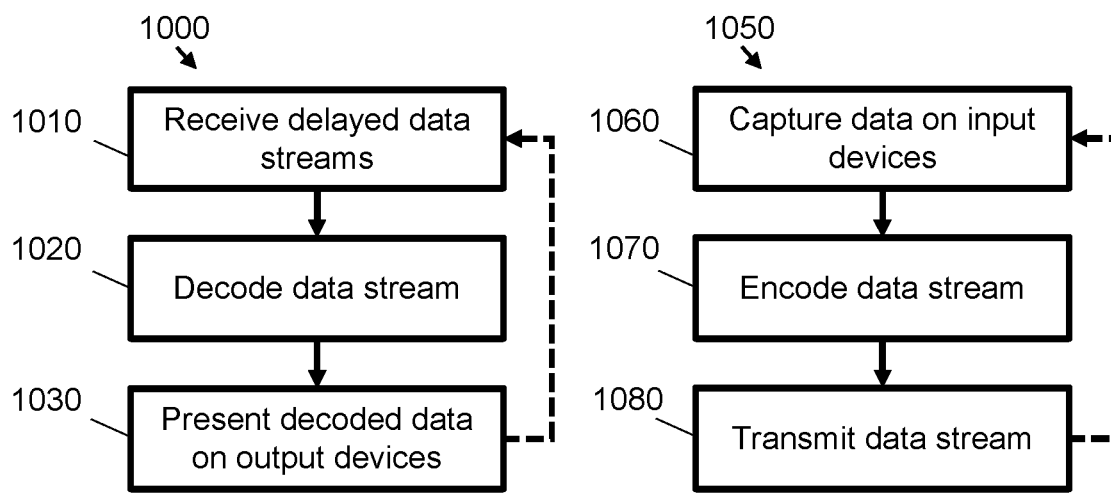
FIG. 10 is a flow diagram showing decoding and encoding operations that may be performed in parallel on a client device.

FIG. 10 shows example methods 1000 and 1050 that may be performed concurrently on a client device. At block 1010, a set of delayed data streams are received. At block 1020, the received data streams are decoded. This may comprise converting a bit stream into a digital signal and/or converting a digital signal into an analogue signal or waveform. At block 1030, the decoded data from the received data streams is output on one or more output devices. These may comprise displays and/or speakers. The sequence may then return to block 1010 to receive a next portion of the data stream. As such, during the collaborative session, a client device is continually receiving and reproducing a set of data streams from a respective set of other client devices.

Method 1050 shows a corresponding method for capturing and encoding data. This method may be performed concurrently with, e.g. in parallel with, the method 1000. For example, the method may comprise two threaded processes that are both being run concurrently at a client device. At block 1060, data is captured on one or more input devices of a client device. These may comprise microphones, video cameras, static cameras, user interfaces, etc. At block 1070, the data is encoded into a data stream. This may comprise digitalisation, sampling, quantisation, bit stream encoding and compression, amongst others. At block 1080 the encoded data stream is transmitted. This may be to a central server in a hub-type configuration or other client devices in a peer-to-peer configuration. Method 1050 may be repeated continuously during the collaborative session, as shown by the dashed arrow.

In a peer-to-peer configuration a client device, such as 200 in FIG. 2, may be adapted to perform the described functions of the distribution server 530 in FIGS. 5A to 5C. For example, memory 225 may comprise computer program code that when executed by the at least one processor causes the client device to first delay a received set of data streams according to a set of respective time delays so as to enforce a global latency, the global latency being greater than a longest latency for transmissions between any two client devices engaging in the collaborative session and being defined as a function of a temporal rate for the series of temporally-coordinated events. The client device may then be arranged to present the delayed set of data streams on at least one output device of the client device, wherein the presented data streams are presented in synchrony with a data stream from the client device that is received at the plurality of other client devices, the synchrony being set by the global latency.

In one variation a simulator may be provided for simulating a collaborative session. The simulator may be implemented on a computing device similar to the client device 200 or the distribution server 300. The collaborative session comprises a series of temporally-coordinated events that are captured by a plurality of client devices, e.g. the simulator acts to simulate a collaborative session as discussed above. Like the client device 200 or the distribution server 300, the simulator comprises at least one processor and a memory. The memory comprises a defined global latency value as discussed above. The memory also comprises content for the collaborative session. For example, this may be a test or studio recording of content that will be performed live in a telematic performance. The memory then comprises computer program code that when executed by the at least one processor causes the simulator to, for a given simulated client device from the plurality of client devices: generate, from the content, a simulated data stream for the given simulated client device; generate, from the content, simulated data streams for other simulated client devices from the plurality of client devices; and present the simulated data streams, including delaying the simulated data streams for other simulated client devices by the global latency. Thus the simulator may simulate the processes shown in FIGS. 5A and 5C, where a given data stream and a set of delayed data streams may be output locally such that a user may experience a simulation of the performance. The user may then modify the content so as to avoid obvious artefacts due to the presence of the global latency. In one case, a non-delayed data stream representing a local presentation may be played on one speaker or display that is local to the simulator; and delayed data streams representing remote presentations may be played on other speakers or displays that are also local to the simulator. Using the simulator it is possible to experience (e.g. see and/or hear) how the collaborative session would be experienced in one or more of the other locations with the expected delay relationships in each scenario. This may facilitate content creation and modification.

In certain examples described herein, including the simulator described above, a metronome (i.e. audio impulse) data stream may be provided. This metronome may be in synchrony with the global latency. The metronome may enable performers to keep in time. For non-audio performances, visual impulses such as flashing or blinking lights may be used. A metronome data stream may be computed that automatically adapts to any variation in the global latency value during the collaborative session, e.g. may change for different movements or performance parts.

Certain examples described herein synchronise a latency that is applied across a set of nodes to content in a collaborative session. The nodes may comprise client devices that act as local capture devices and local reproduction devices. In examples, a global latency is synchronised with a temporal rate, e.g. a "tempo" or "pulse", of the collaborative session. In certain examples the temporal rate may be communicated to the nodes, such as in the form of a metronome channel that may be presented locally. As the global latency is defined as a function of the temporal rate, the metronome channel may be delayed by the global latency yet still be presented in synchrony across the nodes, i.e. a beat will always fall together across the client devices. The global latency may be set by content creators, e.g. composers or songwriters, subject to the constraints described herein. The content creators may have flexibility to vary the global latency subject to the constraints, e.g. pick a global latency equal to two beats rather than one. Having a fixed global latency that is greater than a longest latency, e.g. that in practice may be longer than 150 ms, also allows for better buffering and the ability to reproduce high-quality outputs (e.g. uncompressed or lossless audio, high definition video streams, etc.). It also enables a collaborative session to be performed on hardware and/or software that is less than state of the art, e.g. comparatively "slow" computers and connections.

In certain examples described herein, a collaboration session system may constantly monitor system and network latencies throughout any performance and update an amount of added artificial latency or delay in order to maintain a stable delay across all nodes. In other words, an example system may monitor and compensate for any changes in an average latency during a session or performance to ensuring that presentation of all data streams stays in time throughout the session.

Certain examples have been described that operate on both audio and visual data streams. These examples may be generalised to other data sources as mentioned throughout the examples above. As described in the examples latency may be taken as the time delay between the input and output of a system. In the context of telematic music-making, it may comprise the delay between the moment a musician in one location makes a sound, and the moment a second musician in a different location hears that sound.

Certain examples described herein remove short-term variation in latency in order to establish a stable value, unify latency within a multi-nodal architecture, such that latencies between all nodes are the same, and lock that latency to a desired tempo, such that the duration of the latency is equivalent to the duration of a unit of temporal rhythm.

Data streams as described herein may be UDP data streams that are communicated to a particular port on a client device or distribution server. Each data stream or set of data streams may be received on a different transport protocol port. A distribution server may have a number of ports at least equal to the number of coupled client devices engaging in the collaborative session. Different ports may be used for receiving and transmitting data. Data streams may be compressed or uncompressed. One advantage of setting a global latency to be greater than a longest latency between client devices, whilst applying the constraint on temporal rate, is that data resolutions may be increased, e.g. uncompressed or 'lossless compression' audio may be transmitted rather than compressed audio, or high definition (e.g. 1080i or p—a resolution of 1,920×1,080 pixels that is interlaced or progressive) video may be used. This is because a longer latency (which for 120 BPM may be 500 ms—up to 5-10× normal maximum latencies of 50-100 ms) allows for the use of lower sample rates and/or higher buffer sizes. In one case, changing a buffer size may be used to set the delay applied to the data stream. Redundancy may be used in the encoding of the data stream to reduce loss when transmitting over the network (e.g. wherein copies of data packets are used such that the data may be recovered even if one copy is lost/overly delayed during transmission).

The operation of generating a data stream may vary depending on a particular implementation. In one test example, analogue microphone signals were captured and mixed before being supplied to an audio interface of a client device that performed analogue to digital conversion. For uncompressed audio, a sampling rate of 44.1 kHz and 16-bit quantisation may be used. This generates a digital audio signal that may be transmitted as a data stream over a network. In certain cases, the digital audio may be compressed before transmission, for example using any known audio codecs (such as OPUS standardised as RFC 6716, MPEG-1 or MPEG-2 Audio Layer III, or Advanced Audio Coding—AAC, etc.). Digital audio samples may be packed into network packets (such as TCP or UDP packets), e.g. using a circular buffer. When receiving an audio data stream, network packets contains an audio data stream may be received and sequenced into a digital audio signal. This may be processed and/or mixed digitally before conversion into an analogue audio signal via digital-to-analogue conversion. For video data streams, data may be encoded using any known video codecs (such as VP8-RFC 6386, VP9 or High Efficiency Video Coding—HEVC or H.265, internet Speech Audio Codec—iSAC, Internet Low Bitrate Codec—iLBC, etc.). For example, video data may be provided in SDI format from a video capture device. A USB device may then receive the SDI format data and transmit it to a client device over a USB connection. The video data may then be encoded and transmitted.

Delays may be added to data streams (or signals) using data processing routines and/or hardware (e.g. embedded buffers or buffers implemented in memory). Video may be delayed by storing each video frame in a set of video frames for a predefined time period (the artificial latency or delay period). Audio may be delayed by storing digital samples for a predefined time period. Storage may be in a buffer. Audio signals may be delayed using a ramp to avoid discontinuities, such as audible click due to transients generated by abrupt changes in signal amplitude).

Although examples of computing devices have been described herein, it has been indicated that these may comprise different components in different implementations. For example, a collaboration system may in practice comprise one or more of: microphones, mixers, sound cards, speakers, cameras, screens, computers, routers, converters, wires, connectors and computerised signal processing functions.

Although, client devices have been described as a single entity, it should be understood that functionality may be distributed at each geographical location, e.g. a client device may comprise a plurality of computing devices. For example, different local computing devices may present and capture local content. Or, for example, a distribution server may comprise one computing device to delay audio data streams and another computing device to delay video data streams. As such, client devices and distribution servers as described herein may comprise multiple independent computing devices that are co-located.

The above examples are to be understood as illustrative of the invention. Further examples of the invention are envisaged, and variations are discussed when describing the examples above. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of providing a collaborative session over a network, comprising:
   setting a global latency for the collaborative session,
      the collaborative session comprising a series of geographically-separated temporally-coordinated events,
      the global latency being greater than a longest latency for a plurality of client devices engaging in the collaborative session, and
      the global latency being defined as a function of a temporal rate for the series of temporally-coordinated events; and
   during the collaborative session:
      receiving data streams from the plurality of client devices; and
      synchronising presentation of the received data streams on the plurality of client devices to enforce the global latency,
   wherein synchronising presentation of the received data streams comprises, at a plurality of times during the collaborative session:
   measuring latencies for the plurality of client devices; and
   determining values for a set of non-zero delays to add to the received data streams to enforce the global latency, the values being determined as a function of the global latency and the measured latencies;
   wherein the temporal rate comprises a number of beats per minute for an audio performance and the method comprises:
      defining the global latency as a time period equal to a non-zero number of beats that is greater than a longest latency for a plurality of client devices engaging in the collaborative session.

2. The method of claim 1, wherein the steps of measuring latencies, receiving data streams and determining values for the set of delays are performed at a distribution server communicatively coupled to the plurality of client devices and synchronising presentation comprises transmitting the delayed data streams to the plurality of client devices such that the data streams are presented via the client devices with a synchronised time equal to the global latency.

3. The method of claim 2, wherein synchronising presentation of the received data streams on the plurality of client devices comprises, at a given client device in the plurality of client devices:
   receiving a set of delayed data streams for other client devices in the plurality of client devices from the distribution server; and
   presenting the set of delayed data streams on one or more output devices of the given client device.

4. The method of claim 1,
   wherein receiving data streams from the plurality of client devices comprises, at a given client device in the plurality of client devices:
   receiving a set of data streams for other client devices in the plurality of client devices; and
   wherein determining values for the set of delays to add to the received data streams comprises, at a given client device in the plurality of client devices:
   receiving data indicating the measured latencies for the plurality of client devices; and
   adding delays to the received set of data streams for other client devices to enforce the global latency.

5. The method of claim 1, wherein the collaborative session comprises at least one of audio and video content and the method comprises, at a given client device in the plurality of client devices:
   capturing at least one of audio and video data using at least one input device of the given client device.

6. The method of claim 5, wherein synchronising presentation of the received data streams comprises at least one of:
   presenting a set of audio streams on each client device such that a time period between capturing audio data and presenting each audio stream is equal to the global latency; and
   displaying a set of video streams on each client device such that a time period between capturing video data and displaying each video stream is equal to the global latency.

7. The method of claim 1,
   wherein the collaborative session comprises synchronised audio and video content,
   wherein the method comprises:
   generating an audio data stream for each client device by capturing audio data using at least one microphone coupled to the client device; and
   generating a video data stream for each client device by capturing video data using at least one video camera coupled to the client device;
   wherein determining values for the set of delays to add to the received data streams comprises adding delays to audio and video data streams received from the plurality of client devices to enforce the global latency; and
   wherein synchronising presentation of the received data streams comprises:

presenting a set of audio streams on each client device such that a time period between capturing audio data and presenting each audio stream is equal to the global latency; and displaying a set of video streams on each client device such that a time period between capturing video data and displaying each video stream is equal to the global latency.

8. The method of claim 1, wherein the temporal rate comprises a rate of movement within video content and the method comprises:

defining the global latency as a time period equal to a non-zero multiple of a unit time of movement that is greater than a longest latency for a plurality of client devices engaging in the collaborative session.

9. The method of claim 1, wherein measuring latencies for the plurality of client devices comprises:

measuring at least one of network and system latencies between the plurality of client devices.

10. The method of claim 1, comprising, prior to setting the global latency:

sending, from a distribution server, a test signal to each client device; and at each client device:
outputting the test signal;
capturing the output test signal; and
transmitting the captured test signal to the distribution server, wherein a full system latency for a client device is measured based on a round trip time for the test signal.

11. The method of claim 10, wherein the test signal comprises one or more of: an audio impulse and an audio waveform with non-zero amplitude.

12. The method of claim 10, wherein the test signal comprises a visual encoding.

13. The method of claim 1, wherein measuring latencies for the plurality of client devices and determining values for the set of delays to add to the received data streams are performed dynamically during the collaborative session to enforce a constant global latency for at least a portion of the collaborative session.

14. The method of claim 1, wherein the collaborative session comprises multiple sequences of temporally-coordinated events, each sequence of temporally-coordinated events having a different temporal rate, and wherein setting the global latency comprises:

setting a global latency for each sequence of temporally-coordinated events, wherein each global latency is greater than the longest latency for the plurality of client devices and is set as a function of the respective different temporal rates.

15. The method of claim 1, wherein measuring latencies for the plurality of client devices comprises averaging a plurality of latency measurements for each client device.

16. The method of claim 1, wherein measuring latencies for the plurality of client devices comprises measuring a set of network latencies by pinging each client device.

17. A distribution server for providing a collaborative session over a network, comprising:

a network interface to receive data streams from each of a plurality of client devices engaging in the collaborative session, the collaborative session comprising a series of geographically-separated temporally-coordinated events;

at least one processor; and a memory storing a global latency for the collaborative session, the global latency being greater than a longest latency for the plurality of client devices and being defined as a function of a temporal rate for the series of temporally-coordinated events, wherein the memory comprises computer program code that when executed by at least one processor causes the distribution server to, at a plurality of times during the collaborative session:

measure a latency for each of the plurality of client devices;

determine values for a set of delays to add to the data streams received via the network interface to enforce the global latency, a delay for a particular data stream being a function of the global latency, a stored latency for a client device sending the data stream and a stored latency for a client device receiving the data stream;

buffer the data streams based on the determined values for the set of delays; and transmit the delayed data streams to the plurality of client devices via the network interface such that the data streams are presented via the client devices in synchrony with an end-to-end time delay set by the global latency.

18. A client device for engaging in a collaborative session over a network, comprising:

an encoder to receive data captured by at least one input device of the client device and to generate a data stream for transmission over the network;

a network interface to receive, over the network, a set of data streams from a plurality of other client devices engaging in the collaborative session and, at a plurality of times during the collaborative session, a set of respective time delays to add to the set of data streams, the network interface also being configured to transmit the data stream to the plurality of other client devices over the network, the collaborative session comprising a series of geographically-separated temporally-coordinated events;

at least one processor; and a memory comprising computer program code that when executed by at least one processor causes the client device to, during the collaborative session:

delay the received set of data streams according to the set of respective time delays so as to enforce a global latency, the global latency being greater than a longest latency for transmissions between any two client devices engaging in the collaborative session and being defined as a function of a temporal rate for the series of temporally-coordinated events; and present the delayed set of data streams on at least one output device of the client device, wherein the presented data streams are presented in synchrony with a data stream from the client device that is received at the plurality of other client devices, the synchrony being set by the global latency.

* * * * *